US008255130B2

(12) United States Patent
Fujii et al.

(10) Patent No.: US 8,255,130 B2
(45) Date of Patent: Aug. 28, 2012

(54) CLOSED-LOOP TORQUE PHASE CONTROL FOR SHIFTING AUTOMATIC TRANSMISSION GEAR RATIOS BASED ON FRICTION ELEMENT LOAD SENSING

(75) Inventors: Yuji Fujii, Ann Arbor, MI (US); Gregory Michael Pietron, Canton, MI (US); Seung-Hoon Lee, Northville, MI (US); James William Loch McCallum, Ann Arbor, MI (US); Mohamed Redissi, Ann Arbor, MI (US); David Popejoy, Clawson, MI (US); John Butwin, Ann Arbor, MI (US); Robert Orley Burkhart, Novi, MI (US); Diana Yanakiev, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 581 days.

(21) Appl. No.: 12/421,339

(22) Filed: Apr. 9, 2009

(65) Prior Publication Data
US 2010/0262344 A1 Oct. 14, 2010

(51) Int. Cl.
*F16H 59/14* (2006.01)
(52) U.S. Cl. ........................................................ 701/55
(58) Field of Classification Search .................. 701/55, 701/56
See application file for complete search history.

(56) References Cited

U.S. PATENT DOCUMENTS

| | | | |
|---|---|---|---|
| 3,688,607 A | 9/1972 | Marlow | |
| 4,653,350 A | 3/1987 | Downs et al. | |
| 4,707,789 A | 11/1987 | Downs et al. | |
| 4,724,723 A | 2/1988 | Lockhart et al. | |
| 5,058,460 A | 10/1991 | Hibner et al. | |
| 5,129,286 A | 7/1992 | Nitz et al. | |
| 5,407,401 A | 4/1995 | Bullmer et al. | |
| 5,658,217 A | 8/1997 | Tsukada | |
| 5,823,909 A | 10/1998 | Beim et al. | |
| 5,935,185 A | 8/1999 | Sawamura et al. | |
| 5,938,712 A | 8/1999 | Ibamoto et al. | |
| 5,944,765 A | 8/1999 | Saito et al. | |
| 5,976,054 A | 11/1999 | Yasuoka | |
| 6,110,068 A | 8/2000 | Kraska | |
| 6,122,583 A | 9/2000 | Kirchhoffer et al. | |
| 6,272,936 B1 | 8/2001 | Oreper et al. | |
| 6,292,731 B1 | 9/2001 | Kirchhoffer et al. | |
| 6,364,811 B1 | 4/2002 | Hubbard et al. | |
| 6,385,520 B1 | 5/2002 | Jain et al. | |
| 6,450,921 B1 | 9/2002 | Glab et al. | |
| 6,491,605 B2 | 12/2002 | Saito et al. | |
| 6,577,939 B1 | 6/2003 | Keyse et al. | |
| 6,656,087 B1 | 12/2003 | Runde et al. | |

(Continued)

*Primary Examiner* — Kevin Hurley
(74) *Attorney, Agent, or Firm* — Diederiks & Whitelaw PLC

(57) ABSTRACT

A closed loop shift control apparatus and method based on friction element load controls a torque transfer phase when shifting from a low gear configuration to a high gear configuration for an automatic transmission system. When pressure actuated friction elements are selectively engaged and released to establish torque flow paths in the transmission, measurements or estimates of torsional load exerted on the off-going friction element are used to predict the optimal off-going friction element release timing for achieving a consistent shift feel. The ideal timing to release the off-going friction element is uniquely defined when torque load exerted onto the off-going friction element becomes substantially zero. An on-coming clutch engagement process is controlled by a closed loop control based on measurements or estimates of on-coming clutch torque capacity for a constant shift feel under dynamically changing conditions.

22 Claims, 23 Drawing Sheets

U.S. PATENT DOCUMENTS

| | | |
|---|---|---|
| 6,691,011 B1 * | 2/2004 | Jacobs .......................... 701/54 |
| 6,909,953 B2 * | 6/2005 | Joe et al. ....................... 701/51 |
| 6,955,627 B2 | 10/2005 | Thomas et al. |
| 6,961,646 B2 | 11/2005 | Soliman et al. |
| 6,994,647 B2 | 2/2006 | Cicala et al. |
| 7,066,305 B2 | 6/2006 | Grzesiak et al. |
| 7,216,025 B2 | 5/2007 | Keyse et al. |
| 7,351,183 B2 | 4/2008 | Fujii et al. |
| 7,356,398 B2 | 4/2008 | Steinmetz et al. |
| 7,503,875 B2 | 3/2009 | Fujii et al. |
| 8,010,265 B2 * | 8/2011 | Samie et al. .................... 701/55 |
| 2005/0109564 A1 | 5/2005 | Bai et al. |
| 2010/0318269 A1 * | 12/2010 | Yanakiev et al. ............... 701/55 |

* cited by examiner

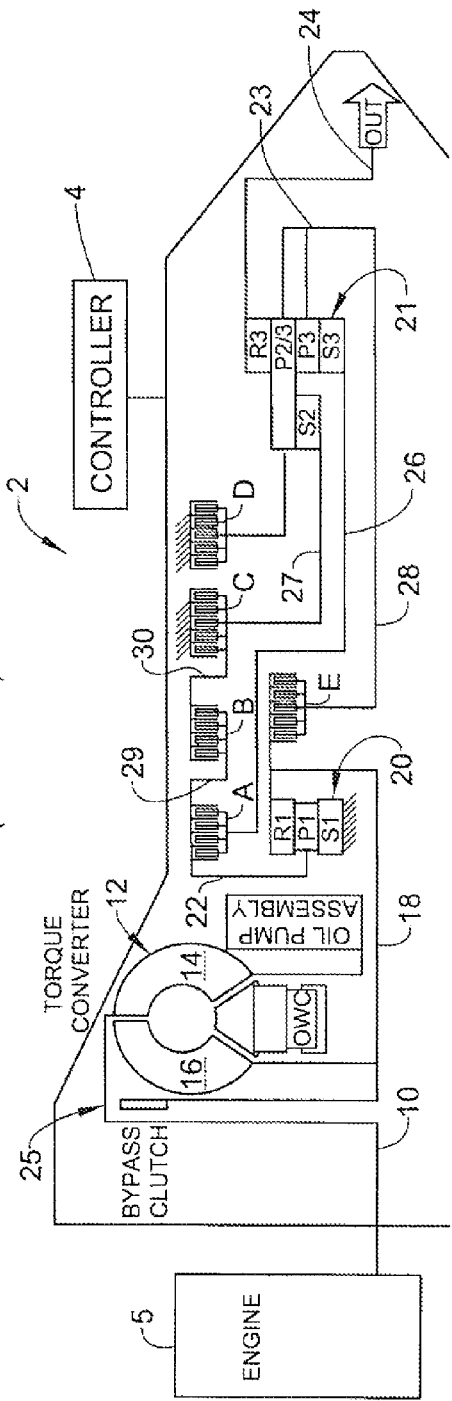

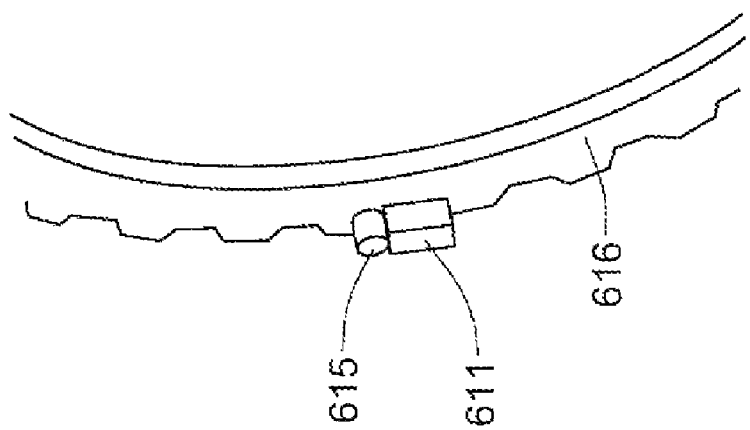
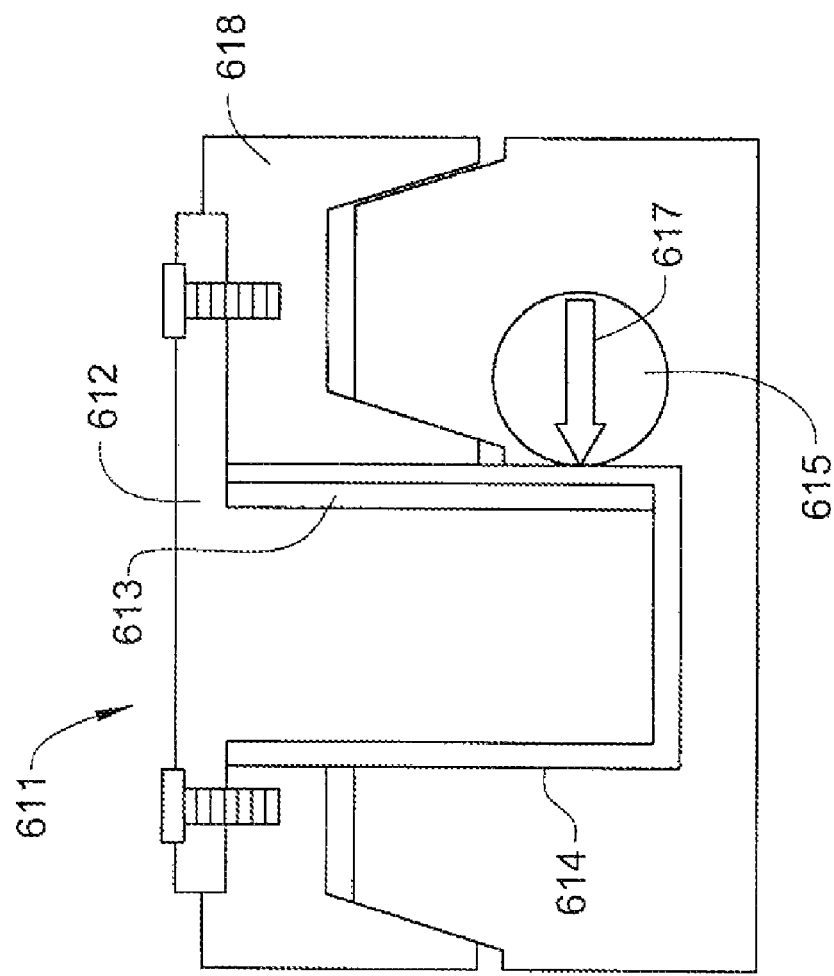

CLOSED-LOOP TORQUE PHASE CONTROL FOR SHIFTING AUTOMATIC TRANSMISSION GEAR RATIOS BASED ON FRICTION ELEMENT LOAD SENSING

FIELD OF INVENTION

The present invention pertains to the field of automatic transmissions for motor vehicles and, more particularly, to a shift control apparatus and method based on friction element load level.

BACKGROUND OF THE INVENTION

A step-ratio automatic transmission system in a vehicle utilizes multiple friction elements for automatic gear ratio shifting. Broadly speaking, these friction elements may be described as torque establishing elements although more commonly they are referred to as clutches or brakes. The friction elements function to establish power flow paths from an internal combustion engine to vehicle traction wheels. During acceleration of the vehicle, the overall speed ratio, which is the ratio of a transmission input shaft speed to a transmission output shaft speed, is reduced during a ratio upshift as vehicle speed increases for a given engine throttle setting. A downshift to achieve a higher speed ratio occurs as an engine throttle setting increases for any given vehicle speed, or when the vehicle speed decreases as the engine throttle setting is decreased.

Various planetary gear configurations are found in modern automatic transmissions. However the basic principle of shift kinematics remains similar. Shifting a step-ratio automatic transmission having multiple planetary gearsets is accompanied by applying and/or releasing friction elements to change speed and torque relationships by altering the torque path through the planetary gearsets. Friction elements are usually actuated either hydraulically or mechanically.

In the case of a synchronous friction element-to-friction element upshift, a first pressure actuated torque establishing element, referred to as an off-going friction element, is released while a second pressure actuated torque establishing element, referred to as an on-coming friction element, engages in order to lower a transmission gear ratio. A typical upshift event is divided into preparatory, torque and inertia phases. During the preparatory phase, an on-coming friction element piston is stroked to prepare for its engagement while an off-going friction element torque-holding capacity is reduced as a step toward its release. During the torque phase, which may be referred to as a torque transfer phase, on-coming friction element torque is raised while the off-going friction element is still engaged. The output shaft torque of the automatic transmission typically drops during the torque phase, creating a so-called torque hole. When the on-coming friction element develops enough torque, the off-going friction element is released, marking the end of the torque phase and the beginning of the inertia phase. During the inertia phase, the on-coming friction element torque is adjusted to reduce its slip speed toward zero. When the on-coming friction element slip speed reaches zero, the shift event is completed.

In a synchronous shift, the timing of the off-going friction element release must be synchronized with the on-coming friction element torque level to deliver a consistent shift feel. A premature release leads to engine speed flare and a deeper torque hole, causing perceptible shift shock for a vehicle occupant. A delayed release causes a tie-up of gear elements, also resulting in a deep and wide torque hole for inconsistent shift feel. A conventional shift control relies on speed measurements of the powertrain components, such as an engine and a transmission input shaft, to control the off-going friction element release process during the torque phase. A conventional torque phase control method releases the off-going friction element from its locked state through an open-loop control based on a pre-calibrated timing, following a pre-determined off-going friction element actuator force profile. This conventional method does not ensure optimal off-going friction element release timing and therefore results in inconsistent shift feel.

Alternatively, a controller may utilize speed signals to gauge off-going friction element release timing. That is, the off-going friction element is released if the controller detects a sign of gear tie-up, which may be manifested as a measurable drop in input shaft speed. When a release of the off-going friction element is initiated prematurely before the on-coming friction element develops enough torque, engine speed or automatic transmission input shaft speed may rises rapidly in an uncontrolled manner. If this so-called engine speed flair is detected, the controller may increase off-going friction element control force to quickly bring down automatic transmission input speed or off-going friction element slip speed. This speed-based or slip-based approach often results in a hunting behavior between gear tie-up and engine flair, leading to inconsistent shift feel. Furthermore, off-going friction element slip control is extremely difficult because of its high sensitivity to slip conditions and a discontinuity between static and dynamic frictional forces. A failure to achieve a seamless slip control during the torque phase leads to undesirable shift shock.

In the case of a non-synchronous automatic transmission, the upshifting event involves engagement control of only an on-coming friction element, while a companion clutching component, typically a one-way coupling, automatically disengages to reduce the speed ratio. The non-synchronous upshift event can also be divided into three phases, which may also be referred to as a preparatory phase, a torque phase and an inertia phase. The preparatory phase for the non-synchronous upshift is a time period prior to the torque phase. The torque phase for the non-synchronous shift is a time period when the on-coming friction element torque is purposely raised for its engagement until the one-way coupling starts slipping or overrunning. This definition differs from that for the synchronous shift because the non-synchronous shift does not involve active control of a one-way coupling or the off-going friction element. The inertia phase for the non-synchronous upshift is a time period when the one-way coupling starts to slip, following the torque phase. According to a conventional upshift control, during the torque phase of the upshifting event for a non-synchronous automatic transmission, the torque transmitted through the oncoming friction element increases as it begins to engage. A kinematic structure of a non-synchronous upshift automatic transmission is designed in such a way that torque transmitted through the one-way coupling automatically decreases in response to increasing oncoming friction element torque. As a result of this interaction, the automatic transmission output shaft torque drops during the torque phase, which again creates a so-called "torque hole." Before the one-way coupling disengages, as in the case previously described, a large torque hole can be perceived by a vehicle occupant as an unpleasant shift shock. An example of a prior art shift control arrangement can be found in U.S. Pat. No. 7,351,183 hereby incorporated by reference.

A transmission schematically illustrated at 2 in FIG. 1 is an example of a prior art multiple-ratio transmission with a controller 4 wherein ratio changes are controlled by friction elements acting on individual gear elements. Engine torque from an input to torque source such as vehicle engine 5 is distributed to torque input element 10 of hydrokinetic torque converter 12. An impeller 14 of torque converter 12 develops turbine torque on a turbine 16 in a known fashion. Turbine torque is distributed to a turbine shaft, which is also transmission input shaft 18. Transmission 2 of FIG. 1 includes gearing in the form of a simple planetary gearset 20 and a compound planetary gearset 21. Gearset 20 has a permanently fixed sun gear S1, a ring gear R1 and planetary pinions P1 rotatably supported on a carrier 22. Transmission input shaft 18 is drivably connected to ring gear R1. Compound planetary gearset 21, sometimes referred to as a Ravagineaux gearset, has a small pitch diameter sun gear S3, a torque output ring gear R3, a large pitch diameter sun gear S2 and compound planetary pinions. The compound planetary pinions include long pinions P2/3, which drivably engage short planetary pinions P3 and torque output ring gear R3. Long planetary pinions P2/3 also drivably engage short planetary pinions P3. Short planetary pinions P3 further engage sun gear S3. Planetary pinions P 2/3, P3 of gearset 21 are rotatably supported on compound carrier 23. Ring gear R3 is drivably connected to a torque output member or shaft 24, which is drivably connected to vehicle traction wheels through a differential and axle assembly (not shown). Gearset 20 is an underdrive ratio gearset arranged in series with respect to compound gearset 21. Typically, transmission 2 preferably includes a lockup or torque converter bypass clutch, as shown at 25, to directly connect transmission input shaft 18 to engine 5 after a torque converter torque multiplication mode is completed and a hydrokinetic coupling mode begins. FIG. 2 is a chart showing a clutch and brake friction element engagement and release pattern for establishing each of six forward driving ratios and a single reverse ratio for transmission 2.

During operation in the first four forward driving ratios, carrier P1 is drivably connected to sun gear S3 through shaft 26 and forward friction element A. During operation in the third ratio, fifth ratio and reverse, direct friction element B drivably connects carrier 22 to shaft 27, which is connected to large pitch diameter sun gear S2. During operation in the fourth, fifth and sixth forward driving ratios, overdrive friction element E connects turbine shaft 18 to compound carrier 23 through shaft 28. Friction element C acts as a reaction brake for sun gear S2 during operation in second and sixth forward driving ratios. During operation of the third forward driving ratio, direct friction element B is applied together with forward friction element A. The elements of gearset 21 then are locked together to effect a direct driving connection between shaft 28 and output shaft 26. The torque output side of forward friction element A is connected through torque transfer element 29 to the torque input side of direct friction element B, during forward drive. The torque output side of direct friction element B, during forward drive, is connected to shaft 27 through torque transfer element 30. Reverse drive is established by applying low-and-reverse brake D and friction element B.

For the purpose of illustrating one example of a synchronous ratio upshift for the transmission of FIG. 1, it will be assumed that an upshift will occur between the first ratio and the second ratio. On such a 1-2 upshift, a first pressure actuated torque establishing element friction element C, starts in the released position before the shift and is engaged during the shift while a second pressure actuated torque establishing element, low/reverse friction element D, starts in the engaged position before the shift and is released during the shift. Forward friction element A stays engaged while friction element B and overdrive friction element E stay disengaged throughout the shift. More details of this type of transmission arrangement are found in U.S. Pat. No. 7,216,025, which is hereby incorporated by reference.

FIG. 3 depicts a general process of a synchronous friction element-to-friction element upshift event from a low gear configuration to a high gear configuration for the automatic transmission system of FIG. 1, For example, the process has been described in relation to a 1-2 synchronous ratio upshift above wherein friction element C is an oncoming friction element and low/reverse friction element D is an off-going friction element, but it is not intended to illustrate a specific control scheme.

The shift event is divided into three phases: a preparatory phase 31, a torque phase 32 and an inertia phase 33. During preparatory phase 31, an on-coming friction element piston is stroked (not shown) to prepare for its engagement. At the same time, off-going friction element control force is reduced as shown at 34 as a step toward its release. In this example, off-going friction element D still retains enough torque capacity shown at 35 to keep it from slipping, maintaining transmission 2 in the low gear configuration. However, increasing on-coming friction element control force shown at 36 reduces net torque flow within gearset 21. Thus, the output shaft torque drops significantly during torque phase 32, creating a so-called torque hole 37. A large torque hole can be perceived by a vehicle occupant as an unpleasant shift shock. Toward the end of torque phase 32, off-going friction element control force is dropped to zero as shown at 38 while on-coming friction element apply force continues to rise as shown at 39. Torque phase 32 ends and inertia phase 33 begins when off-going friction element D starts slipping as shown at 40. During inertia phase 33, off-going friction element slip speed rises as shown at 41 while on-coming friction element slip speed decreases as shown at 42 toward zero at 43. The engine speed and transmission input speed 44 drops as the planetary gear configuration changes. During inertia phase 33, output shaft torque indicated by profile 45 is primarily-affected by on-coming friction element C torque capacity indirectly indicated by force profile 46. When on-coming friction element C completes engagement or when its slip speed becomes zero at 43, inertia phase 33 ends, completing the shift event.

FIG. 4 shows a general process of a synchronous friction element-to-friction element upshift event from the low gear configuration to the high gear configuration in which off-going friction element D is released prematurely as shown at 51 compared with the case shown in FIG. 3. When off-going friction element D is released, it breaks a path between automatic transmission input shaft 18 and automatic transmission output shaft 24, depicted in FIG. 1, no longer transmitting torque to automatic transmission output shaft at the low gear ratio. Since on-coming friction element C is yet to carry enough engagement torque as indicated by a low apply force at 52, automatic transmission output shaft torque drops largely, creating a deep torque hole 53 which can be felt as a shift shock. At the same time, engine speed or transmission input speed rapidly increases as shown at 54, causing a condition commonly referred to as engine flare. A large level of engine flare can be audible to a vehicle occupant as unpleasant noise. Once on-coming friction element C develops sufficient engagement torque as indicated by a rising control force at 55, automatic transmission input speed comes down and the output torque rapidly moves to a level at 56 that corresponds to on-coming friction element control force 55.

Under certain conditions, this may lead to a torque oscillation 57 that can be perceptible to a vehicle occupant as unpleasant shift shock.

FIG. 5 shows a general process of a friction element-to-friction element upshift event from the low gear configuration to the high gear configuration in which off-going friction element release is delayed as shown at 61 compared with the case shown in FIG. 3, Off-going friction element D remains engaged even after on-coming friction element C develops a large amount of torque as indicated by a large actual control force at 65. Thus, transmission input torque continues to be primarily transmitted to output shaft 24 at the low gear ratio. However, large on-coming friction element control force 65 results in a drag torque, lowering automatic transmission output shaft torque, creating a deep and wide torque hole 63. This condition is commonly referred to as a tie-up of gear elements. A severe tie-up can be felt as a shift shock or loss of power by a vehicle occupant.

As illustrated in FIGS. 3, 4, and 5 a missed synchronization of off-going friction element release timing with respect to on-coming friction element torque capacity leads to engine flare or tie-up. Both conditions lead to varying torque levels and profiles at automatic transmission torque output shaft 24 during shifting. If these conditions are severe, they result in undesirable driving experience such as inconsistent shift feel or perceptible shift shock. The prior art methodology attempts to mitigate the level of missed-synchronization by use of an open loop off-going friction element release control based on speed signal measurements. It also attempts to achieve a consistent on-coming friction element engagement torque by an open-loop approach during a torque phase under dynamically-changing shift conditions.

FIG. 6 illustrates a prior art methodology for controlling a friction element-to-friction element upshift from a low gear configuration to a high gear configuration for automatic transmission 2 in FIG. 1. The prior art on-coming control depicted in FIG. 6 applies to a conventional torque phase control utilized for either a synchronous or non-synchronous shift, in this example off-going friction element D remains engaged until the end of torque phase 32. Although the focus is placed on torque phase control, FIG. 6 depicts the entire shift control process. As shown the shift event is divided into three phases: a preparatory phase 31, a torque phase 32 and an inertia phase 33. During preparatory phase 31, an on-coming friction element piston is stroked (not shown) to prepare for its engagement. At the same time, off-going friction element control force is reduced as shown at 34 as a step toward its release. During torque phase 32 controller 4 commands an on-coming friction element actuator to follow a prescribed on-coming friction element control force profile 64 through an open-loop based approach. Actual on-coming friction element control force 65 may differ from prescribed profile 64 due to control system variability. Even if actual control force 65 closely follows prescribed profile 64, on-coming friction element engagement torque may still vary largely from shift to shift due to the sensitivity of the on-coming friction element engagement process to engagement conditions such as lubrication oil flow and friction surface temperature. Controller 4 commands enough off-going element control force 61 to keep off-going element D from slipping, maintaining the planetary gearset in the low gear configuration until the end of torque phase 32. Increasing on-coming friction element control force 65 or engagement torque reduces net torque flow within the low-gear configuration. Thus, output shaft torque 66 drops significantly during torque phase 32, creating so-called torque hole 63. If the variability in on-coming friction element engagement torque significantly alters a shape and depth of torque hole 63, a vehicle occupant may experience inconsistent shift feel Controller 4 reduces off-going friction element actuator force at 38, following a pre-calibrated profile, in order to release it at a pre-determined timing 67. The release timing may be based on a commanded value of on-coming friction element control force 62. Alternatively, off-going friction element D is released if controller 4 detects a sign of significant gear tie-up, which may be manifested as a detectable drop in input shaft speed 44. Inertia phase 33 begins when off-going friction element D is released and starts slipping as shown at 67. During inertia phase 33, off-going friction element slip speed rises as shown at 68 while on-coming friction element slip speed decreases toward zero as shown at 69. Transmission input speed 44 drops as the planetary gear configuration changes. During inertia phase 33, output shaft torque 66 is primarily affected by on-coming friction element torque capacity or control force 65. The shift event completes when the on-coming friction element comes into a locked or engaged position with no slip as shown at 70.

FIG. 7 illustrates another prior art methodology for controlling torque phase 32 of a synchronous upshift process from the low gear configuration to the high gear configuration. In this example, controller 4 allows off-going friction element D to slip during torque phase 32. Although the focus is placed on torque phase control. FIG. 7 depicts the entire shift event. During preparatory phase 31, an on-coming friction element piston is stroked to prepare for its engagement. At the same time, off-going friction element control force 86 is reduced as a step toward its slip. During torque phase 32, on-coming friction element control force is raised in a controlled manner. More specifically, controller 4 commands on-coming friction element actuator to follow a prescribed on-coming friction element control force profile 87 through an open-loop based approach. An actual on-coming friction element control force 88 may differ from the commanded profile 87 due to control system variability. Even if actual control force 88 closely follows commanded profile 87, on-coming friction element engagement torque may still vary largely from shift to shift due to the sensitivity of on-coming friction element engagement process to engagement conditions such as lubrication oil flow and friction surface temperature. Increasing on-coming friction element control force 88 or on-coming friction element engagement torque reduces net torque flow within the low-gear configuration. This contributes to output shaft torque 99 being reduced during torque phase 32, creating a so-called torque hole 85.

If the variability in on-coming friction element engagement torque significantly alters the shape and depth of torque hole 85, the vehicle occupant may experience inconsistent shift feel. A deep torque hole may be perceived as an unpleasant shift shock. During torque phase 32, off-going friction element control force is reduced as shown at 82 to induce an incipient slip 83. Controller 4 attempts to maintain off-going friction element slip at a target level through a closed-loop control based on off-going friction element speed 96 which may be directly measured or indirectly derived from speed measurements at pre-determined locations. A variability in off-going friction element control force 82 of off-going element slip torque may alter the shape and depth of torque hole 85, thus affecting shift feel. If controller 4 inadvertently allows a sudden increase in off-going friction element slip level, automatic transmission input speed or engine speed 90 may surge momentarily, causing the so-called engine speed flair or engine flair. The engine flair may be perceived by a vehicle occupant as an unpleasant sound.

Controller 4 initiates off-going friction element release process at a predetermined timing shown at which may be based on a commanded value of on-coming friction element control force 93. Controller 4 lowers off-going friction element control force, following a pre-calibrated profile 94. If a release of off-going friction element D is initiated prematurely before on-coming friction element C develops enough torque, engine speed or input shaft speed may rise rapidly in an uncontrolled manner. If this engine speed flair 90 is detected, controller 4 increases off-going friction element control force to delay off-going friction element release process. Alternatively to the pre-determined off-going friction element release timing, controller 4 may utilize speed signals to determine a final off-going friction element release timing. When a sign of significant gear tie-up, which may be manifested as a measurable drop in input shaft speed, is detected, off-going friction element D is released following a pre-calibrated force profile. Inertia phase 33 begins when off-going friction element torque capacity or control force drops to non-significant level 95. During inertia phase 33, off-going friction element slip speed rises 96 while on-coming friction element slip speed decreases 97 toward zero. The transmission input shaft speed drops as shown at 98 as the planetary gear configuration changes. During inertia phase 33, the output shaft torque 99 is primarily affected by on-coming friction element torque capacity, which is indicated by its control force 100. When on-coming friction element C becomes securely engaged at 101, the shift event completes.

In summary, a prior art methodology, which is based on an open-loop on-coming friction element control during a torque phase, cannot account for control system variability and dynamically-changing shift conditions during the torque phase, resulting in inconsistent shift feel or unpleasant shift shock. A pre-determined off-going friction element release timing with a pre-calibrated control force profile cannot ensure an optimal timing under dynamically changing shift conditions, resulting in inconsistent shift feel or unpleasant shift shock. The alternative approach to gauge off-going friction element release timing based on speed signals often results in a hunting behavior between gear tie-up and engine flair, leading to inconsistent shift feel. Furthermore, off-going friction element slip control is extremely difficult because of its high sensitivity to slip conditions. In addition, a large discontinuity exists between static and dynamic friction coefficients, introducing a large torque disturbance during an incipient slip control. A failure to achieve a seamless off-going friction element slip control during the torque phase leads to undesirable shift shock.

As can be seen from the above discussion the controllability of both off-going friction element and on-coming friction element is desirable during a torque phase in order to deliver a consistent and seamless shift quality. The prior art that depends on an open-loop approach which may be based on speed measurements does not have any solution to the problem of consistently controlling torque passing through either a multiple disc clutch or a band brake and therefore is a need in the art for a transmission control system that minimizes shift shock during a gear ratio change that does not rely solely on traditional speed signal measurement and instead relies on measured or estimated friction element load level in either a multiple plate clutch or a band brake during a torque phase of gear-ratio changing.

SUMMARY OF THE INVENTION

The present invention is directed to a closed loop shift control apparatus and method based on friction element load level that controls on-coming friction element engagement and off-going friction element release process during a torque phase of gear ratio changing from a low gear configuration to a high gear configuration for an automatic transmission system. Pressure actuated torque establishing elements define torque flow paths in transmission gearing as they are selectively engaged and released. Direct measurements or estimates of torsional load exerted onto an off-going friction element and direct measurements or estimates of on-coming friction element engagement torque are used to improve shift feel. In a first embodiment the measurements of torsional load are used to predict an optimal off-going friction element release timing for achieving a consistent shift feel. The ideal timing to release the off-going friction element, is uniquely defined when the torque load exerted onto the off-going friction element becomes zero or a near-zero level. The measurements or estimates of on-coming friction element engagement torque level are used in a closed-loop control method to closely follow a given target trajectory for achieving a consistent shift feel.

More specifically, the method for controlling gear ratio shifts in a multiple-ratio automatic transmission is applied to an automotive vehicle powertrain. The automatic transmission includes an input torque source, a torque output member, gearing defining multiple torque flow paths from the input torque source to the torque output member, and first and second pressure actuated torque establishing elements for shifting from a first gear configuration with a low speed ratio to a second gear configuration with a higher speed ratio during a ratio upshift event. The upshift event has a preparatory phase, a torque phase and an inertia phase. The torque phase may be referred to as a torque transfer phase. The torque capacity of the first torque establishing element is maintained against slippage during the preparatory phase. An amount of torque load transmitted through the first torque establishing element is measured or estimated during the torque phase. In accordance with the first preferred embodiment of the invention, the torque capacity of the second torque establishing element is increased during the torque phase by a closed loop control based on measured or estimated engagement torque. The torque capacity of the first torque establishing element is maintained during the torque phase until the amount of torque transmitted through the first torque establishing element drops below a predetermined amount and then the torque capacity of the first torque establishing element is decreased. In accordance with the second preferred embodiment of the invention, the torque capacity of the second torque establishing element is controlled based on the measured or estimated torque during the torque phase so that the torque transmitted over time is tightly controlled under a limited control bandwidth of the on-coming friction element. The torque capacity of the first torque establishing element is still maintained during the torque phase until the amount of torque transmitted through the first torque establishing element drops below a predetermined amount and then the torque capacity of the first torque establishing element is decreased.

The system for controlling a multiple-ratio automatic transmission for an automotive vehicle powertrain includes a first actuator for changing the torque capacity of the first torque establishing element and a load sensor or an estimator for measuring an amount of torque transmitted through the first torque establishing element. A second actuator is provided for increasing torque capacity of the second torque establishing element. Preferably the transmitted torque is controlled in a closed loop manner based on a measured or estimated torque. A controller maintains the torque capacity of the first torque establishing element during the torque phase until the amount of torque transmitted through the first torque establishing element drops below a predetermined amount. Thereafter the controller decreases the torque capacity of the first torque establishing element. With this arrangement, engine flair and shift shock are reduced.

Additional objects, features and advantages of the present invention will become more readily apparent from the following detailed description of preferred embodiments when taken in conjunction with the drawings, wherein like reference numerals refer to corresponding parts in the several views.

BRIEF DESCRIPTION OF DRAWINGS

FIG. 1 is a schematic diagram of a gearing arrangement for an automatic transmission system according to the prior art;

FIG. 2 is a chart showing a clutch and brake friction element engagement and release pattern for establishing each of six forward driving ratios and a single reverse ratio for the transmission schematically illustrated in FIG. 1;

FIG. 17A depicts a load sensor assembly in accordance with another preferred embodiment of the invention placed against a pin extending from an endplate of a friction element for measuring a relative load level on the off-going friction element;

FIG. 17B depicts the load sensor assembly of FIG. 17A installed in a transmission case;

DESCRIPTION OF PREFERRED EMBODIMENTS

Figure 3:
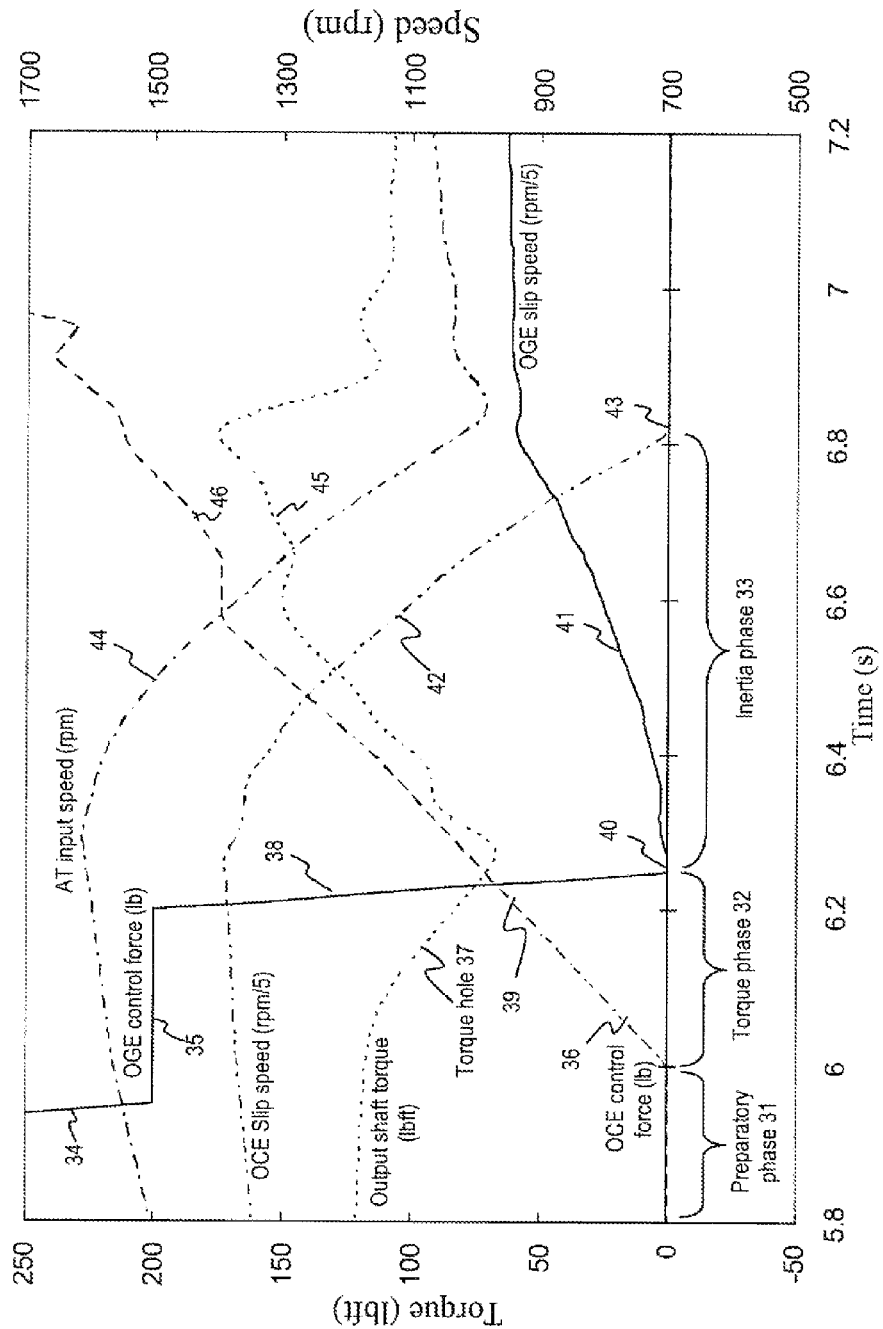
FIG. 3 is a plot of a general process of a synchronous friction element-to-friction element upshift event from a low gear configuration to a high gear configuration for the prior art automatic transmission system of FIG. 1.
Figure 4:
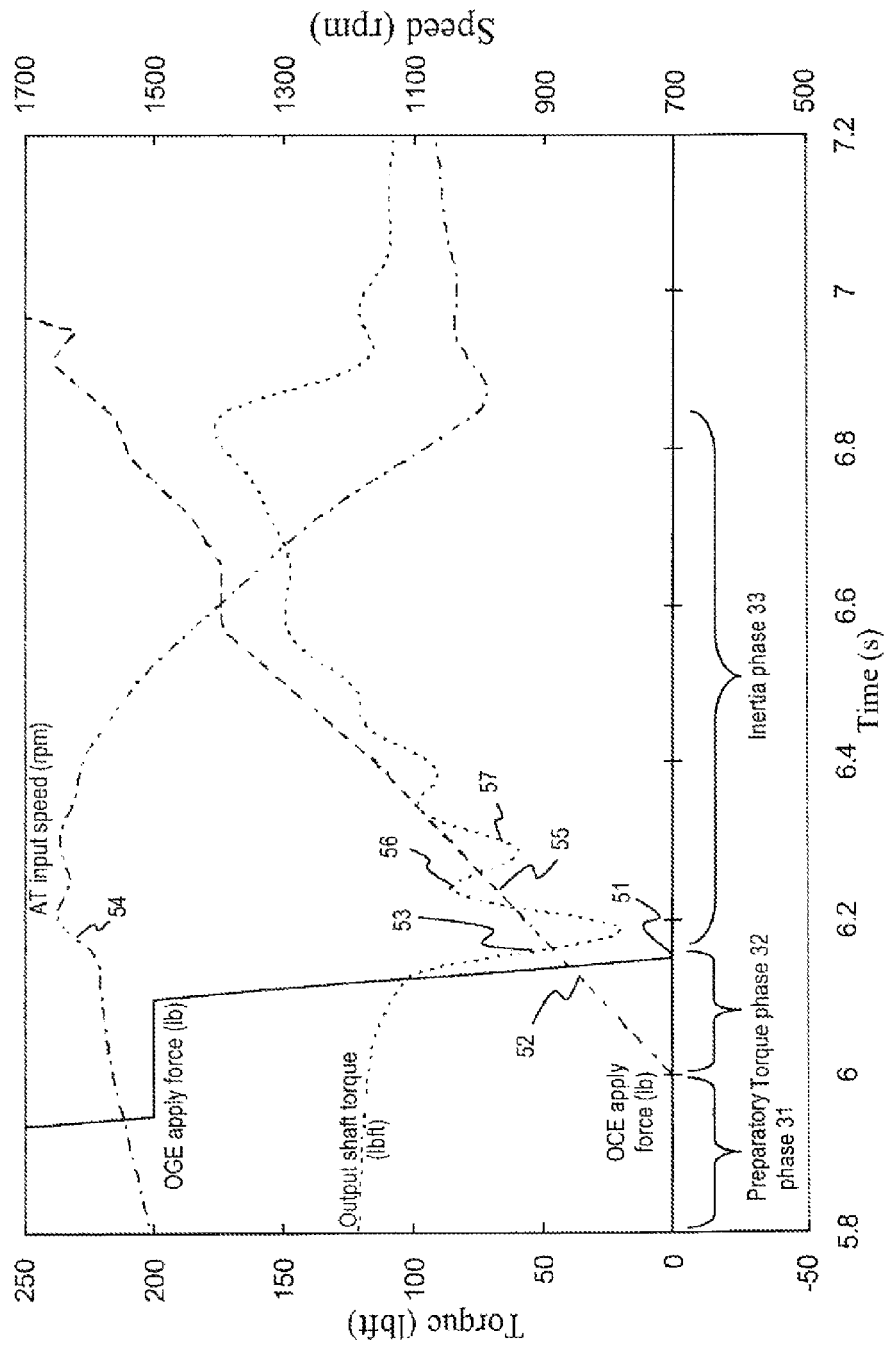
FIG. 4 is a plot of the general process of a synchronous friction element-to-friction element upshift event from the low gear configuration to the high gear configuration in which the off-going friction element is released prematurely compared with the case shown in FIG. 3.
Figure 5:
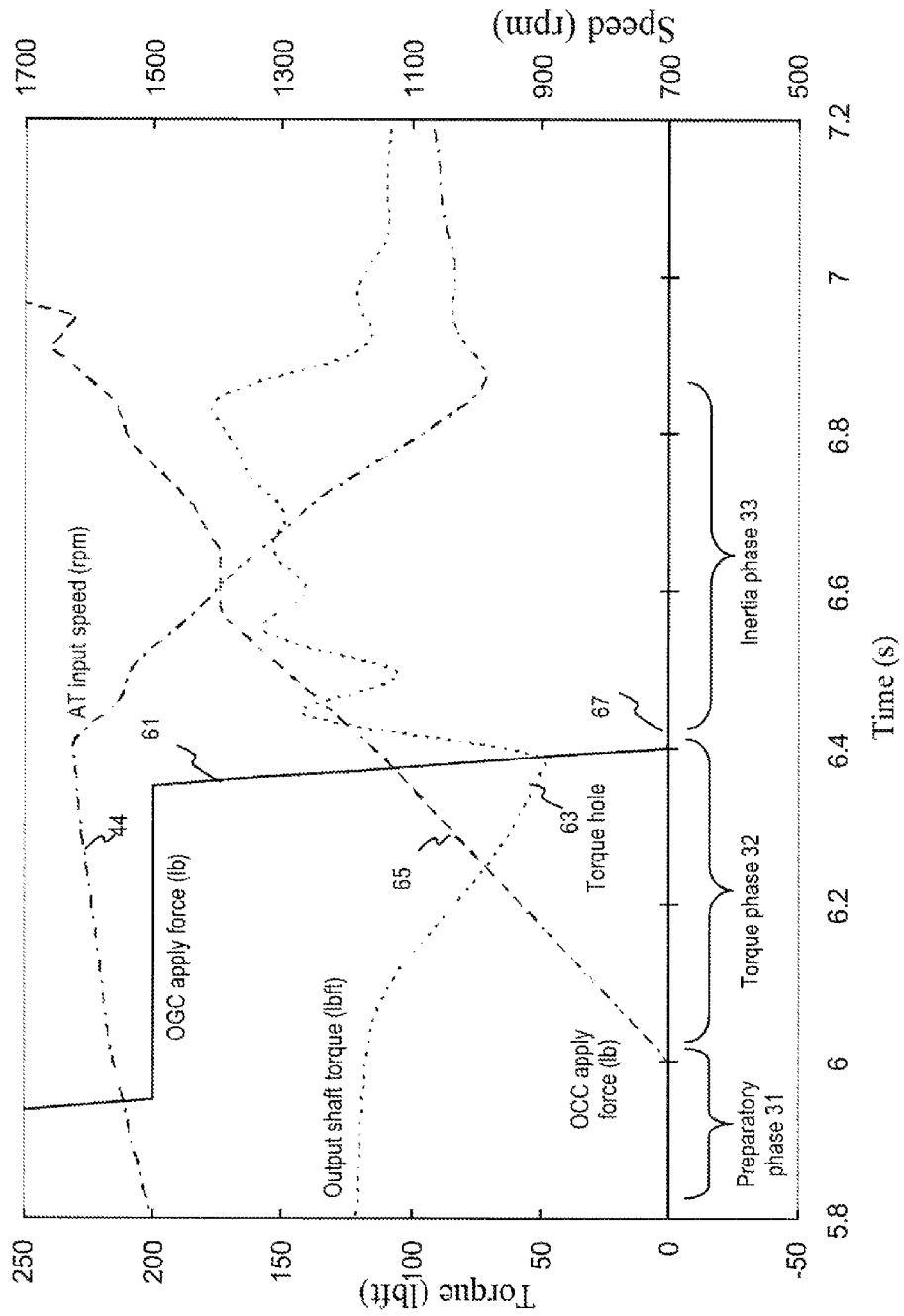
FIG. 5 is a plot of the general process of a synchronous friction element-to-friction element upshift event from the low gear configuration to the high gear configuration in which off-going friction element release is delayed compared with the case shown in FIG. 3.
Figure 6:
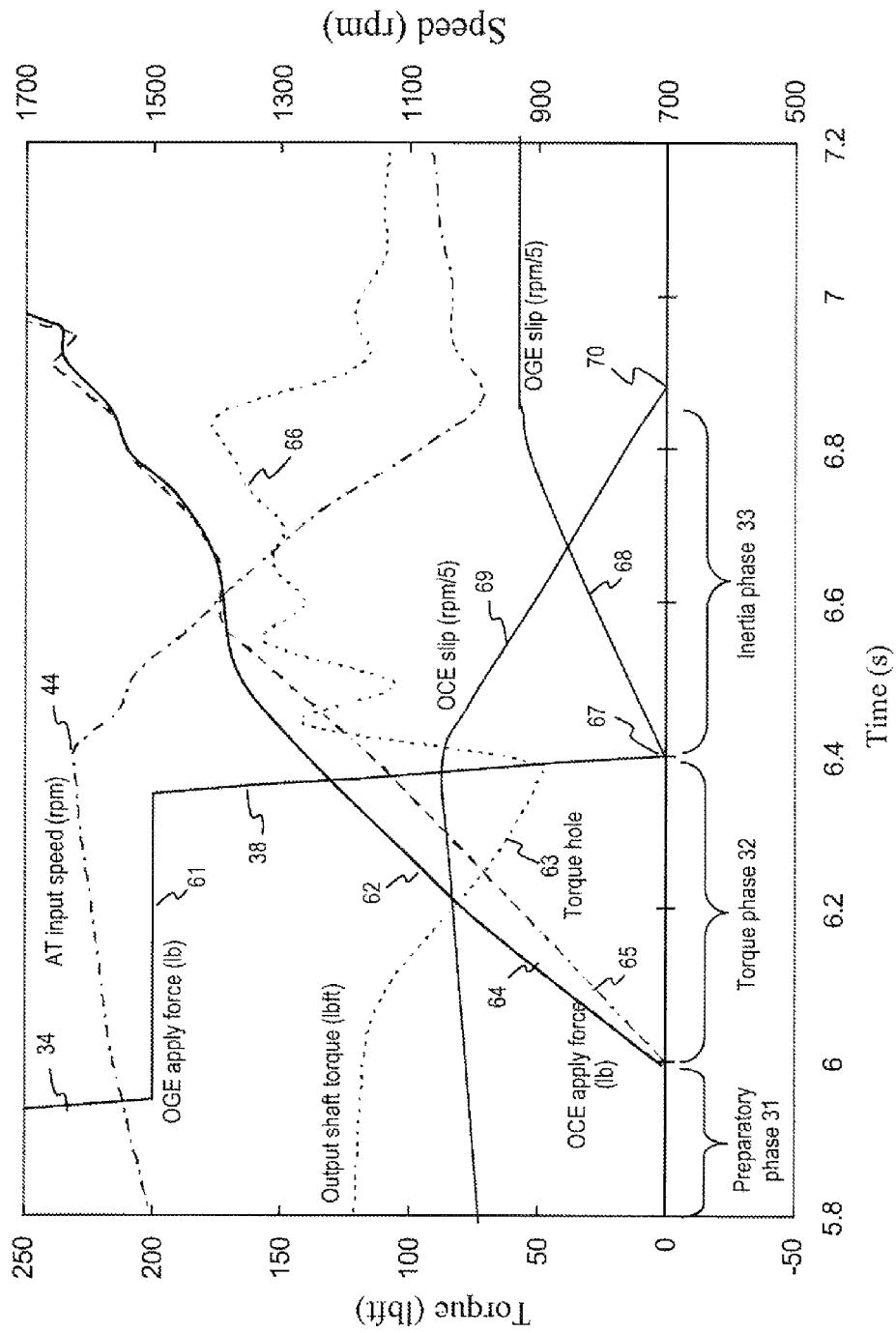
FIG. 6 is plot of a prior art synchronous friction element-to-friction element upshift control from a low gear configuration to a high gear configuration based on speed measurements of powertrain components for the automatic transmission system in FIG. 1 wherein an off-going friction element remains locked during the torque phase.
Figure 7:
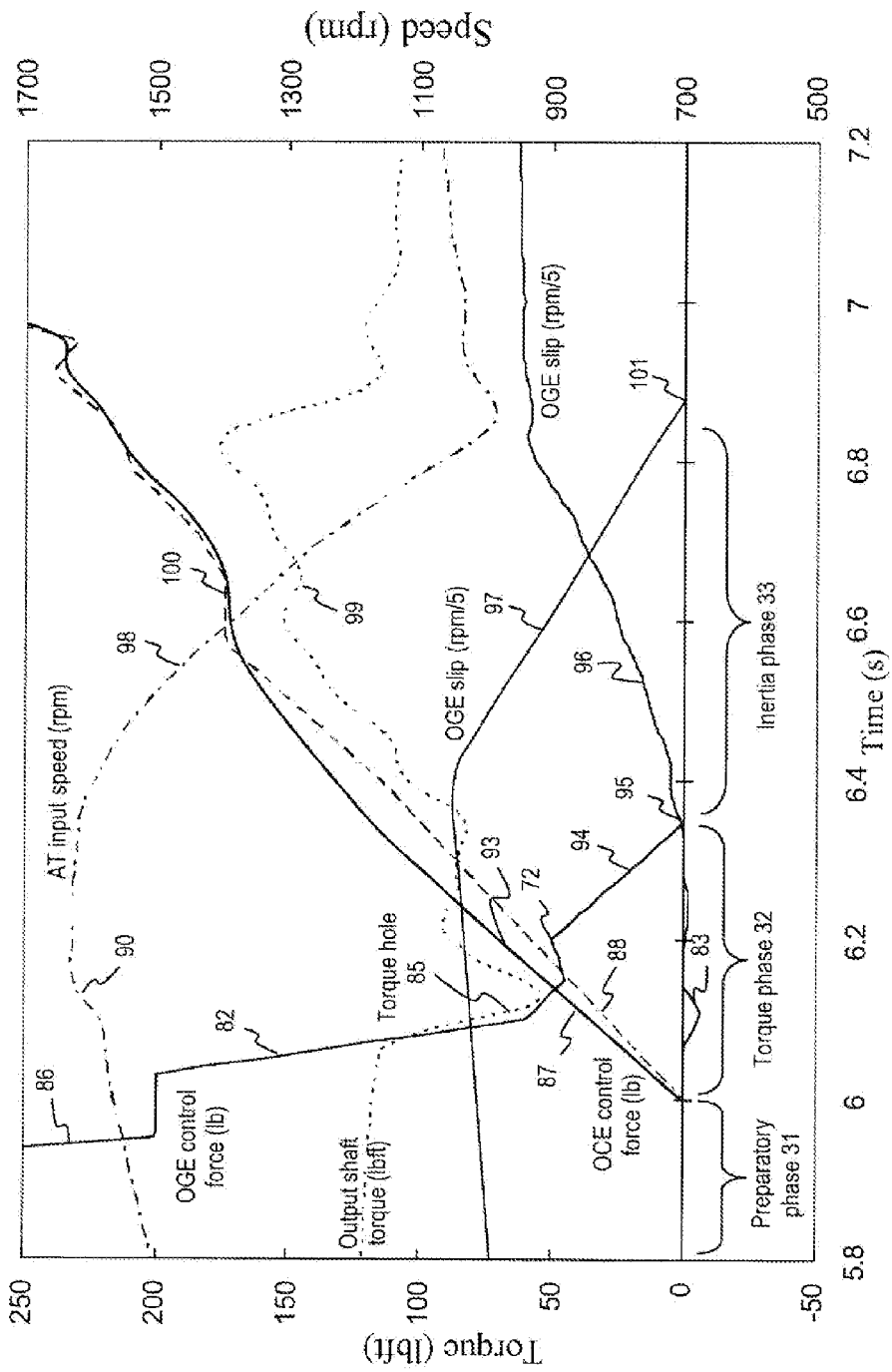
FIG. 7 is plot of a prior art synchronous friction element-to-friction element upshift control from a low gear configuration to a high gear configuration based on speed measurements of powertrain components for the automatic transmission system in FIG. 1, wherein an off-going friction element is slipped during the torque phase.
Figure 8:
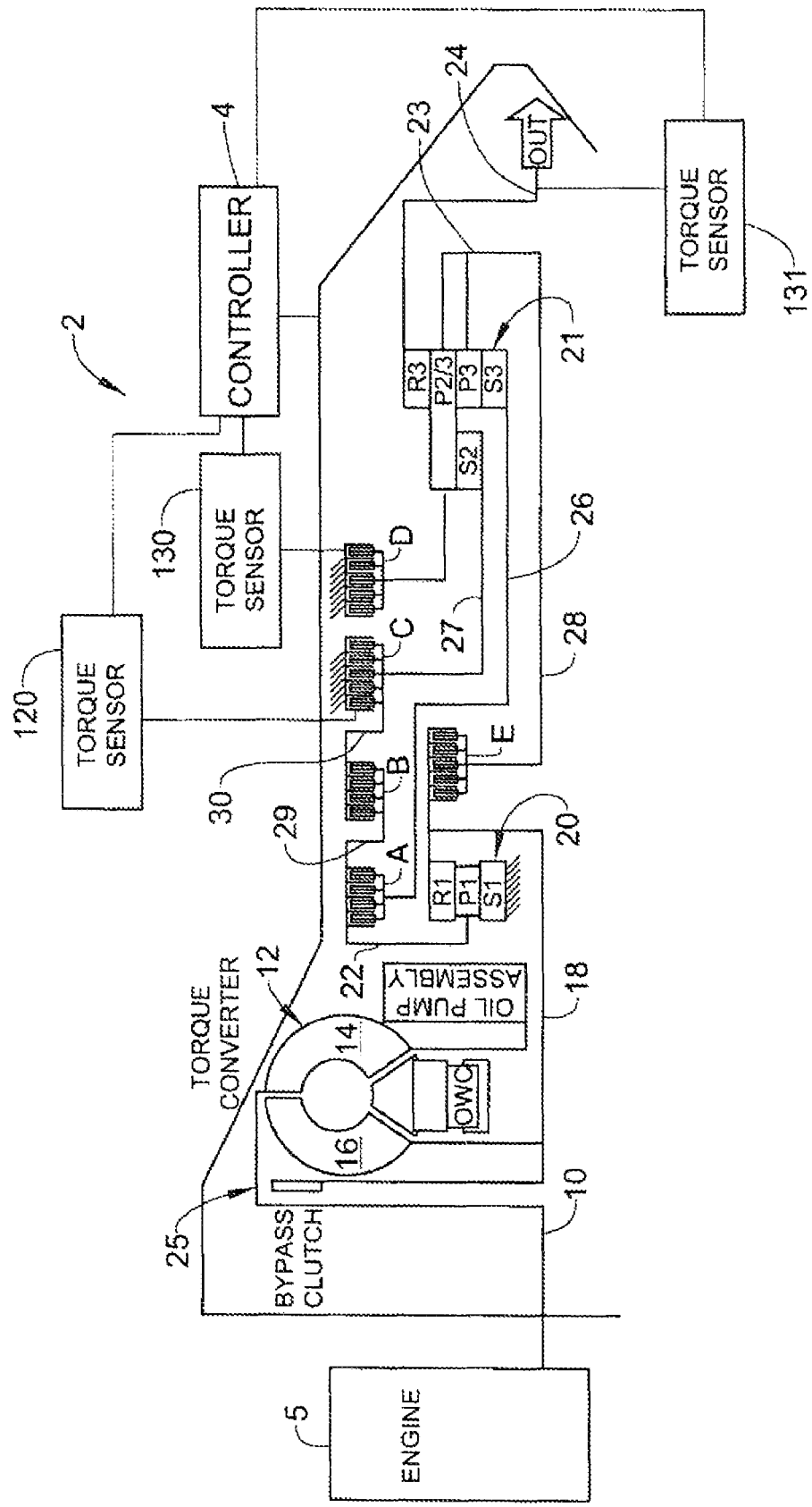
FIG. 8 is a schematic diagram of a gearing arrangement for an automatic transmission system including load sensor locations in accordance with a first preferred embodiment of the invention.

With initial reference to FIG. 8, there is shown an automotive transmission employing the invention. As this automatic transmission arrangement is similar to the one schematically illustrated in FIG. 1 all the same parts have been indicated with corresponding reference numbers and therefore a duplicate discussion of these parts will not be made here. Instead, of particular importance is the addition of a torque sensor 120 located in friction element C, a load sensor 130 located in friction element D, and a torque sensor 131 located in transmission output shaft 24, all connected to controller 4 for controlling various functions of transmission 2 as will be more fully discussed below.

Figure 9:
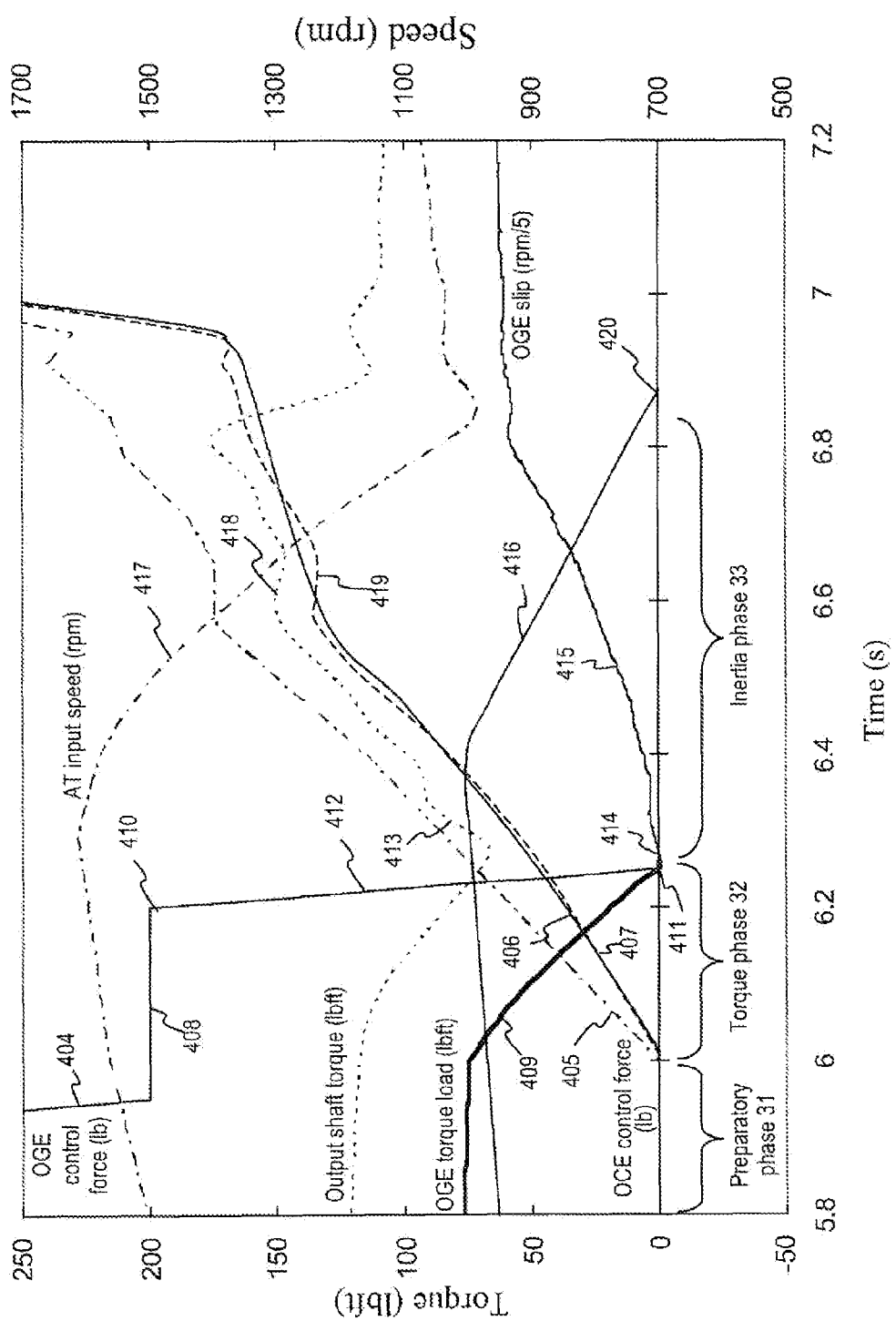
FIG. 9 is a plot of a synchronous friction element to friction element upshift control from a low gear configuration to a high gear configuration for the automatic control system in FIG. 8 based on direct measurements or estimates of torsional load exerted onto an off-going friction element in accordance with a preferred embodiment of the invention.

FIG. 9 shows a torque phase control method according to a preferred embodiment of the invention for a synchronous friction element-to-friction element upshift from a low gear configuration to a high gear configuration for the automatic transmission system in FIG. 8. The on-coming friction element control method illustrated here is also applicable to non-synchronous shift control. The shift event is divided into 3 phases: preparatory phase 31, torque phase 32 and inertia phase 33. During preparatory phase 31, an on-coming friction element piston is stroked to prepare for its engagement. At the same time, off-going friction element control force or its torque capacity is reduced as shown at 404 as a step toward its release. During torque phase 32, on-coming friction element control force is raised in a controlled manner as shown at 405. More specifically, controller 4 commands on-coming friction element actuator to follow a target on-coming friction element engagement torque profile 406 through a closed-loop control directly based on the measurements of on-coming friction element engagement torque 407 during torque phase 32. On-coming friction element torque 407 may be directly measured using a load sensor according to this invention as more fully described below. On-coming friction element engagement torque directly affects transmission output torque that is transmitted to the vehicle wheels. This torque-based close-loop control eliminates or significantly reduces the undesirable effects of on-coming friction element engagement torque sensitivity to hardware variability and shift conditions, achieving a consistent shift feel, regardless of shift conditions.

Alternatively to the direct measurements, on-coming friction element torque can be determined from the measurements of transmission output shaft torque using torque sensor 131 depicted in FIG. 8. Mathematically, on-coming friction element torque $T_{OCE}$ can be described as a function of measured output shaft torque $T_{OS}$ as:

$$T_{OCE}(t) = G_{OCE} T_{OS}(t) \qquad \text{Eq. (1)}$$

Where $G_{OCE}$ can be readily obtained based on a given gear set geometry.

Yet alternatively, on-coming friction element torque $T_{OCE}$ can be estimated through the following Eq. (2), based on a slight change in transmission component speeds $\omega_i$ at predetermined locations (i=1, 2, ..., n), $$T_{OCE}(t) = F_{trans}(\omega_i, t) \qquad \text{Eq. (2)}$$

where t indicates time and $F_{trans}$ represents a mathematical description of a transmission system. More specifically, as on-coming friction element engagement torque rises 407, torque levels transmitted through various transmission components change. This creates small, but detectable changes in $\omega_i$. A transmission model, $F_{trans}$, can be readily derived to estimate on-coming friction element engagement torque when off-going friction element remains locked during torque phase 32.

Controller 4 commands enough off-going friction element control force 408 to keep it from slipping, maintaining the planetary gearset in the low gear configuration during torque phase 32. As on-coming friction element engagement torque 407 increases, a reaction torque goes against a component that is grounded to a transmission case. More specifically, in this case, torque transmitted through off-going friction element or torsional load 409 exerted onto off-going friction element D decreases proportionally, Off-going friction element load level 409 can be directly monitored using a torque sensor such as is more fully discussed below. Alternatively, off-going friction element load level $T_{OGE}$ 409 can be calculated from measured or estimated on-coming friction element engagement torque $T_{OCE}$ 407 when off-going friction element remains locked during torque phase 32 according to;

$$T_{OGE}(t) = F_{OCE/OGE}(T_{OCE}(t)) \qquad \text{Eq. (3)}$$

where $F_{OCE/OGE}$ represents a torque ratio between on-coming friction element C and off-going friction element D at the low gear configuration and can be obtained based on gear set geometry. According to this invention, off-going friction element D is released at an ideal timing when torque load exerted onto off-going friction element D becomes zero or a near-zero level. Transmission controller 4 initiates a release process of off-going friction element D as shown at 410 as off-going friction element load 409 approaches zero at 411, Off-going friction element torque is dropped quickly as shown at 412 with no slip control. Since no off-going friction element slip control is involved, the method is insensitive to off-going friction element break-away friction coefficient variability. In addition, the quick release of off-going friction element D shown at 412 induces little disruption in output shaft torque at 413 because off-going friction element load level is near zero as shown at 411 at the moment of release. Off-going friction element D starts slipping 411 once its control force reaches a non-significant level. During inertia phase 33, a conventional control approach may be utilized based on on-coming friction element slip measurements. Off-going friction element slip speed increases as shown at 415 while on-coming friction element slip speed decreases as shown at 416. The transmission input speed drops as shown at 417 as the planetary gear configuration changes. During inertia phase 33, output shaft torque 418 is primarily affected by on-coming friction element torque level 419. Alternatively to the conventional control, a closed loop control that is based on measured or estimated on-coming friction element torque may continue to be employed. When on-coming friction element C completes engagement or when its slip speed becomes zero as shown at 420, the shift event completes.

Figure 10:
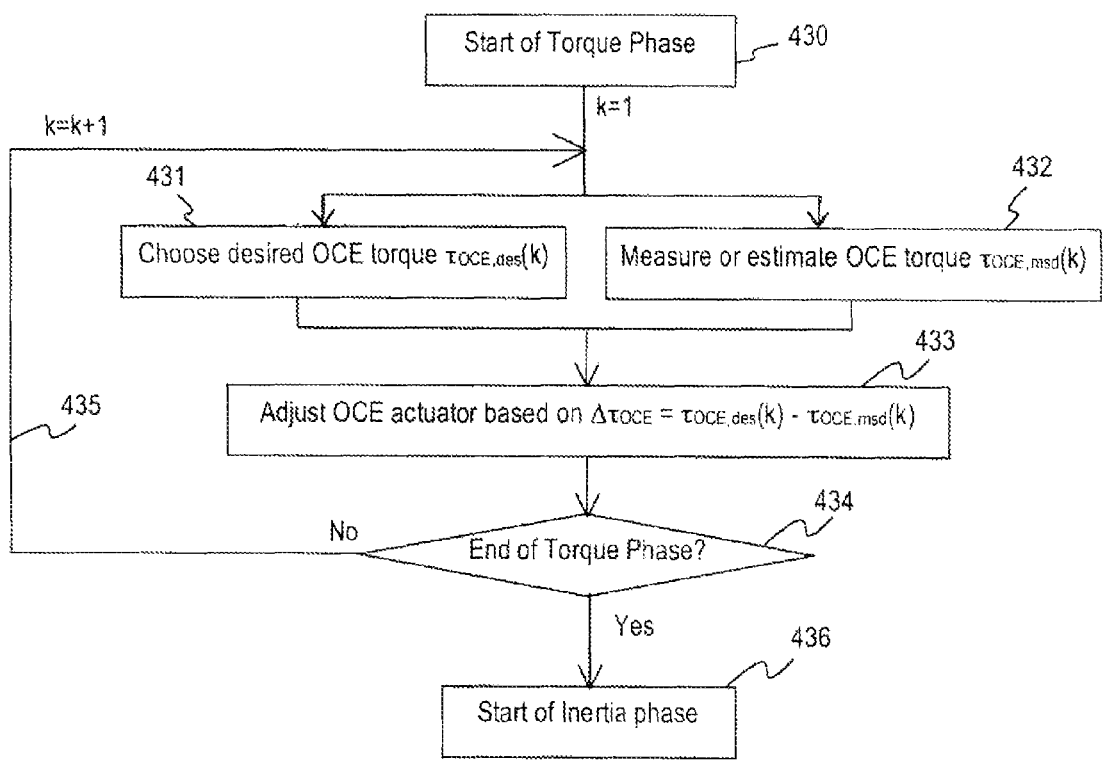
FIG. 10 is a flow chart showing an on-coming friction element control method in accordance with a preferred embodiment of the invention.

FIG. 10 shows a flow chart of closed-loop on-coming friction element engagement torque control during the torque phase depicted in FIG. 9. Step 430 is the beginning of torque phase 32. Controller 4 chooses a desired on-coming element torque at step 431 and measures or estimates an actual torque at step 432. At step 433, the on-coming friction element actuator is then adjusted by controller 4 based on the difference between the measured/estimated torque level and the actual torque level. At step 434, controller 4 determines if torque phase has ended and if so controller 4 starts inertia phase 33 at 436.

Figure 11:
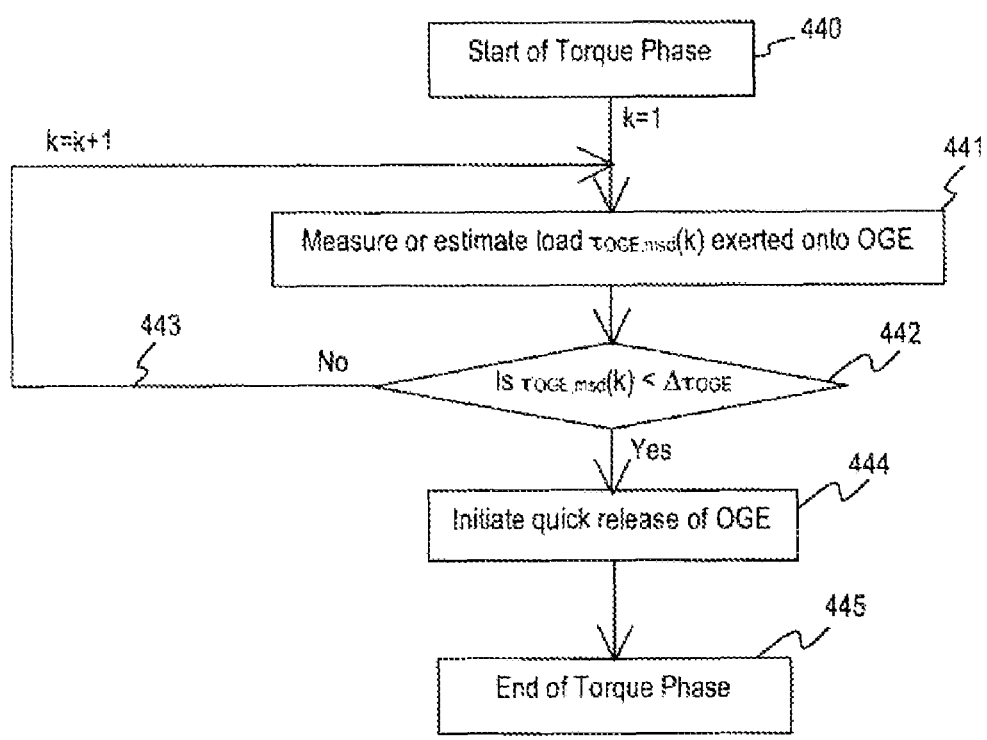
FIG. 11 is a flow chart showing an off-going element release control method in accordance with a preferred embodiment of the invention.

FIG. 11 shows a flow chart of an off-going friction element torque control process during torque phase 32 depicted in FIG. 9. The process starts at step 440 at the beginning of torque phase 32. A load transmitted through locked off-going friction element D is directly measured or estimated at step 441. At step 442, when its load level drops below a predetermined level, off-going friction element D is promptly released at step 444. The control process ends at step 445 at the end of torque phase 32.

Figure 12:
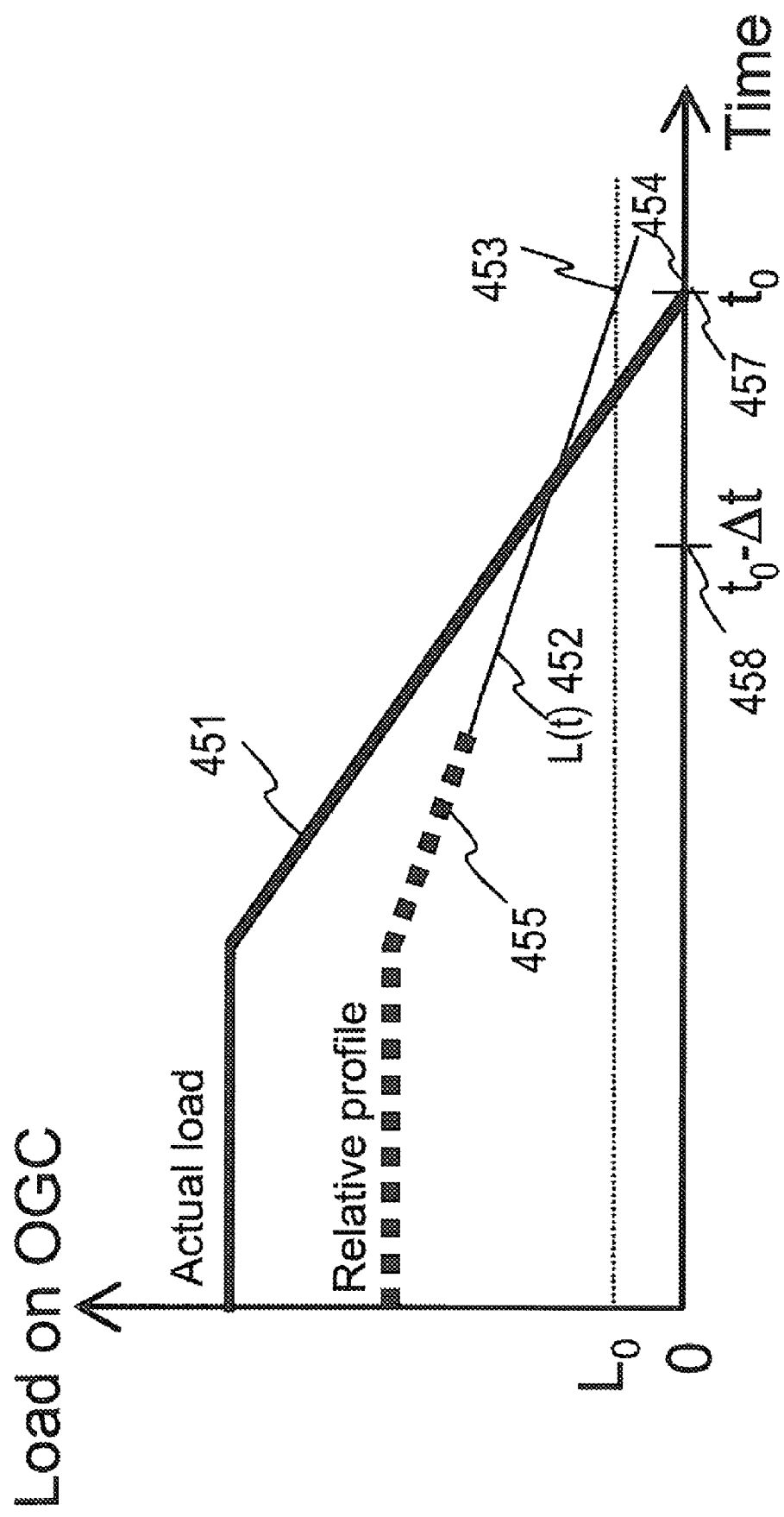
FIG. 12 is a plot of the process used to determine an ideal release timing of the off-going friction element in accordance with first preferred embodiment of the invention.

Alternatively to the measurements or estimates of absolute load levels, FIG. 12 illustrates the process to determine the ideal release timing of off-going friction element D based on relative load measurements or estimates according to this invention. FIG. 12 depicts an actual load profile 451 exerted on off-going friction element D and a relative load profile L(t) 452 measured by torque sensor 130 during the upshift event in FIG. 9. The preferred embodiment requires only relative load profile L(t) 452. Relative load profile L(t) 452 is preferably constructed from uncalibrated sensor output that reflects actual load profile 451, but not its absolute levels. This feature eliminates the need of a full sensor calibration across the entire load range. It also makes the preferred embodiment insensitive to sensor output drift over time. However, the preferred embodiment relies on knowledge of sensor measurement $L_0$ 453 which corresponds to zero off-going friction element load level 454. Sensor measurement $L_0$ 453 can be readily identified, as often as required, by sampling sensor output while vehicle transmission 2 is in a neutral or a similar condition where no load is exerted onto off-going friction element D. Transmission controller 4 collects relative load data 455 during torque phase 32 to dynamically construct relative load profile L(t) 452. Then, controller 4 extrapolates L(t) to predict $t_0$ 457 where $L(t_0)=L_0$. Once $t_0$ 457 is obtained in advance, controller 4 predicts when to initiate an off-going friction element release process. Specifically controller 4 starts the release process at a time equal to $t_0$–$\Delta t$ shown at 458, where $\Delta t$ is the time required to quickly drop off-going friction element control force to zero. In this way, off-going friction element D starts slipping at or near ideal timing $t_0$ 457 when the actual off-going friction element load level is at or close to zero as shown by reference numeral 454.

Figure 13:
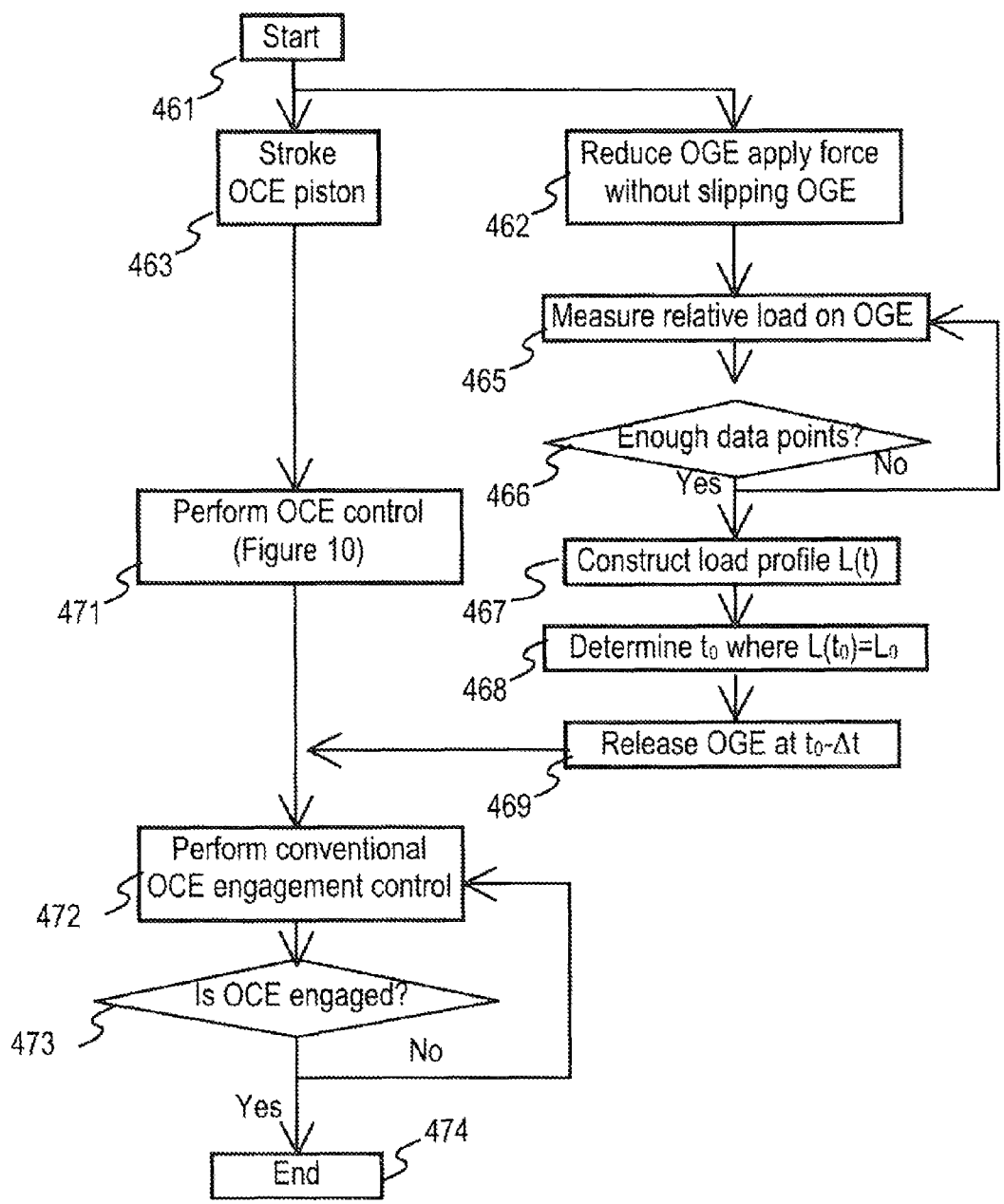
FIG. 13 is a flow chart showing a shift control method in accordance with a preferred embodiment of the invention.

FIG. 13 presents a flow chart of the new upshift control method according to this invention. During preparatory phase 31 at step 461 of a synchronous upshift event, off-going friction element torque capacity or apply force is reduced to a holding level without allowing any slip at step 462 while on-coming friction element piston is stroked at step 463. During torque phase 32, transmission controller 4 measures at step 465 a relative load level exerted onto off-going friction element D at a pre-specified sampling frequency using torque sensor 130 described further below. Controller 4 repeats this measurement step 465 until enough data points are collected at step 466 for dynamically constructing a relative load profile at step 467 that shows load as a function of time L(t). Once relative load profile L(t) is obtained, controller 4 predicts the ideal off-going friction element release timing to at step 468 so that $L(t_0)=L_0$ where $L_0$ corresponds to a substantially zero load level on off-going friction element D. Controller 4 initiates an off-going friction element release process at $t_0$–$\Delta t$ as shown as step 469 where $\Delta t$ is a pre-specified time required to quickly drop off-going friction element apply force to zero. Alternatively, controller 4 may initiate the off-going friction element release process at $t_{thres}$ such that $L(t_{thres})=L_{thres}$ where $L_{thres}$ is a predetermined threshold. No slip control is required for off-going friction element D during torque phase 32. Inertia phase 33 starts when off-going friction element D is released. The control methodology illustrated in FIG. 10 is preferably applied to on-coming friction element C during torque phase 32. A conventional on-coming friction element control may be applied during inertia phase 33 based on speed signals. When on-coming friction element C becomes securely engaged at step 473, the shift event completes at step 474.

Figure 14:
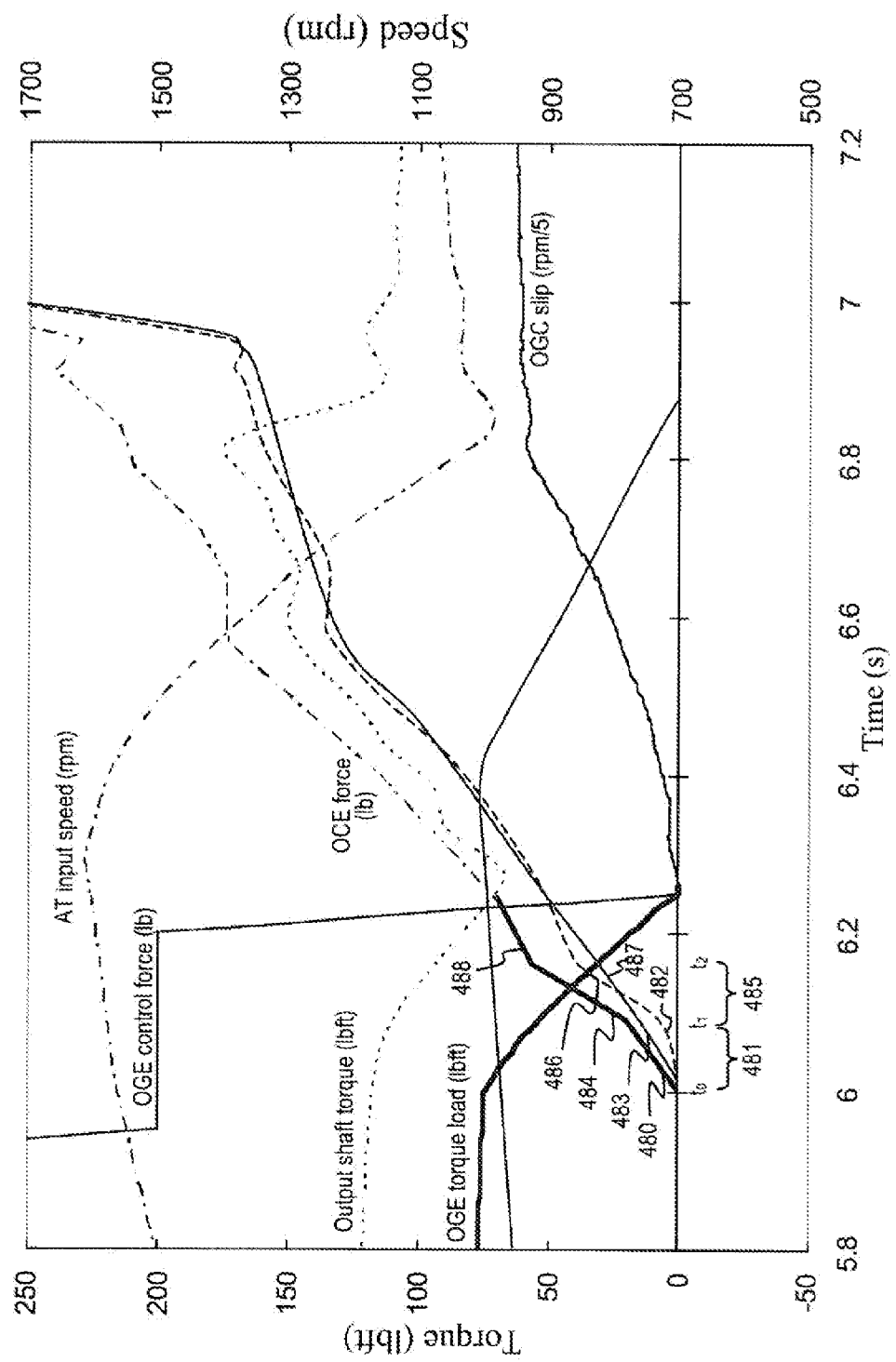
FIG. 14 is a plot of a synchronous friction element-to-friction element upshift from a low gear configuration to a high gear configuration for the automatic transmission control system in FIG. 8 based on the direct measurements or estimates of torsional load exerted onto an off-going friction element and an on-coming element in accordance with another preferred embodiment of the invention.

FIG. 14 illustrates another preferred embodiment of the invention relating to a transmission system with an on-coming friction element actuator which may not have a sufficient control bandwidth compared with a sampling time of load measurements. At the beginning of torque phase 32, a transmission controller raises on-coming friction element actuator force based on a pre-calibrated slope 480 over a time interval $\Delta t$ between $t_0$ and $t_1$ as shown at interval 481. During interval 481, on-coming friction element load is either measured or estimated with a sampling time finer than $\Delta t$ to construct an engagement torque profile 482. If the measured or estimated torque profile 482 indicates a slow rise compared with a target torque profile 483, controller 4 increases a slope of commanded on-coming friction element control force for a next interval 485 between $t_1$ and $t_2$. On the other hand, if the actual torque is rising faster than a target profile, controller 4 reduces a slope of commanded on-coming friction element control force. For example, during interval 485 between $t_1$ and $t_2$, on-coming friction element load is either measured or estimated with a sampling time finer than $\Delta t$ to construct an engagement torque profile 486. The measured or estimated slope 486 of the engagement torque is compared against a target profile 487 to determine a slope 488 of commanded force profile for the following control interval. This process is repeated until the end of torque phase 32. The off-going friction element release control remains the same as that shown in FIG. 9.

Figure 15:
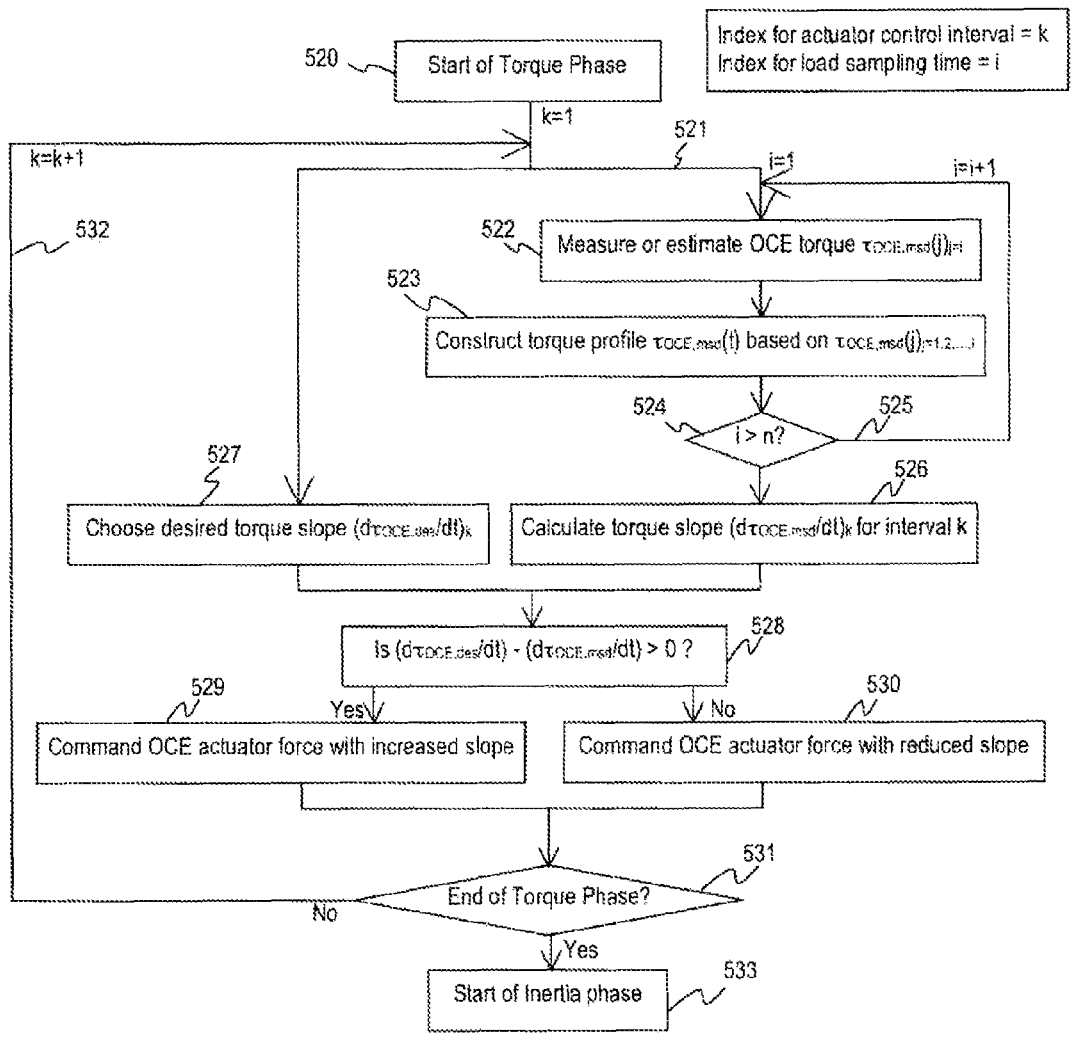
FIG. 15 is a flow chart showing an on-coming friction element shift control method in accordance with another preferred embodiment of the invention.

FIG. 15 shows a flow chart of alternative closed-loop on-coming friction element engagement torque control during torque phase depicted in FIG. 14. The start of torque phase 32 is shown at step 520. Following path 521, the off-coming friction element torque is measured or estimated at step 522 and torque profile 482 is created therefrom at step 523. The method may have to go through several iterations as shown by decision block 524 and return loop 525. Torque slope profile 486 or an average derivative of torque profile 482 is calculated at 526 and while a desired target slope profile 487 is calculated at 527 and compared with torque slope profile 486 at 528. The actuator force slope is increased 529 or decreased 530 and the process continues 531, 532 until the end of torque phase 32. The process then proceeds to inertia phase 33 at 533.

Figure 16B:
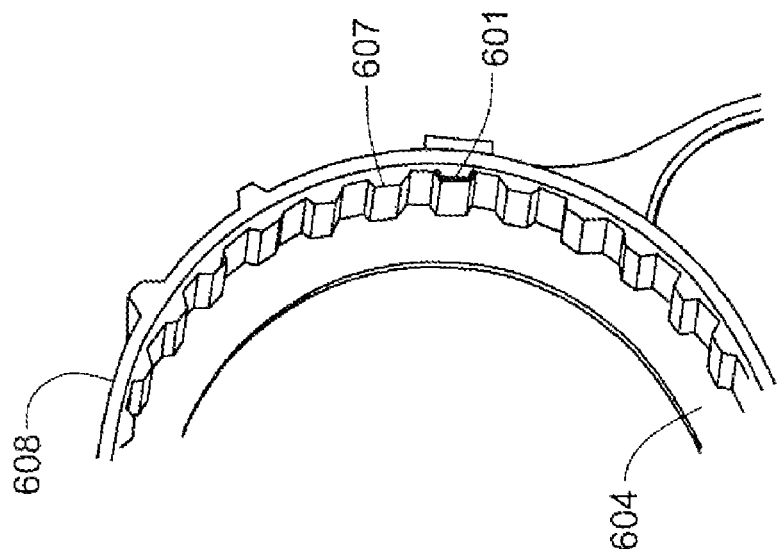
FIG. 16B depicts the load sensor assembly of FIG. 16A installed in a transmission case.
Figure 16A:
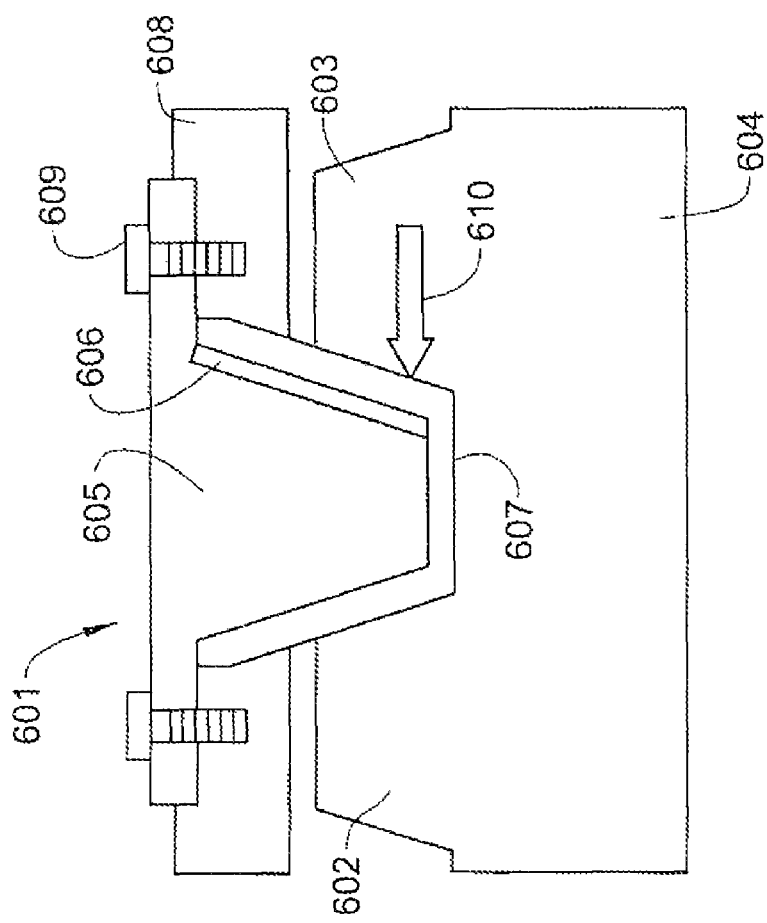
FIG. 16A depicts a load sensor assembly in accordance with another preferred embodiment of the invention installed between two teeth of a endplate of a friction element for measuring a relative load level on the friction element.

While the shift control has been discussed above, attention is now directed to the structure of the various load sensor assemblies. FIGS. 16A, 16B, 17A, 17B, 18 and 19 depict several preferred embodiments of load sensor assemblies for measuring a relative load level exerted on off-going friction element D or on-coming element C according to preferred embodiments of the invention. FIG. 16A shows a cross-sectional view of a load sensor assembly 601 design according to a preferred embodiment. In FIG. 16A, sensor assembly 601 is installed between two teeth 602, 603 of an end plate 604 of off-going friction element D. Assembly 601 includes a core 605, a load sensor 606 and a sleeve 607, Core 605 is preferably made from a metal, such as steel or aluminum, and is securely grounded to a transmission case 608 through anchor bolts 609. Load sensor 606 is preferably a film-type sensor constructed with a pressure-resistive material. Sensor 606 generates an electrical signal that corresponds to a relative level of loading force 610. Sleeve 607, which protects sensor 606, is preferably made from rubber, plastic or metal. While cover 607 is referred to as either a sleeve or a cover, it is to be understood that the terms are interchangeable. FIG. 16B illustrates an installation of sensor assembly 601 in transmission case 608. Sensor assembly 601 is securely positioned in a location where a spline tooth is normally located otherwise. When off-going friction element plates are installed, end plate 604 fits snugly around sensor assembly 601, providing a preload to sensor 606. That is, sensor 606 preferably indicates non-zero output $L_0$ even when no load is exerted on off-going friction element D or its end plate 604. When the torque load is exerted as shown by arrow 610 during a shift event, the output from sensor 601 provides a relative measure of the load on off-going friction element D. When this embodiment is employed to measure relative load exerted onto an off-going friction element such as when torque sensor 130 is used to measure the load on friction element D, it is readily understood that optimal friction element release timing is identified when the sensor output level approaches to $L_0$ corresponding to zero load level.

FIGS. 17A and 17B depict another sensor assembly 611 which has a similar structure to assembly 601 in FIG. 16A. Assembly 611 includes a grounded core 612, a force sensor 613 and a sleeve 614. However, as illustrated in FIG. 17A, assembly 611 is placed against a pin 615 that is fixed to an end plate 616 of off-going friction element D. Sensor 613 is preloaded against pin 615, providing non-zero output in the absence of torque load on off-going friction element end plate 616 (FIG. 17B). When a torque load is exerted on off-going friction element D, pin 615 is pressed with a force 617 against sensor 613 across sleeve 614. This enables sensor 613 to provide the relative measure of torque load on off-going friction element D. FIG. 17B shows a view of sensor assembly 611 and off-going friction element end plate 616 with pin 615 in a transmission case 618.

Figure 18:
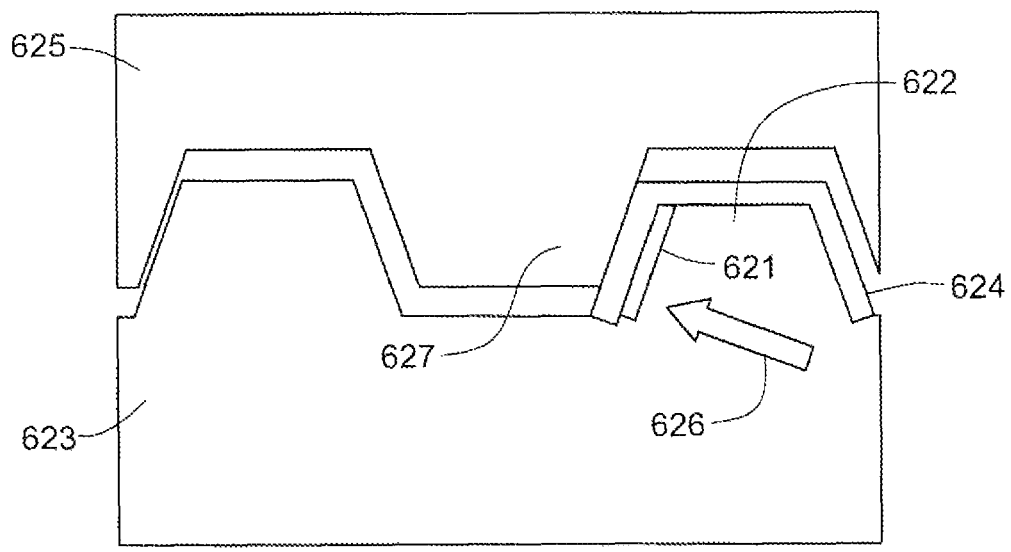
FIG. 18 depicts a load sensor in accordance with another preferred embodiment of the invention formed of a thin film-type load sensor and attached to a tooth for measuring a relative load level on the off-going friction element.

FIG. 18 shows another potential embodiment of this invention wherein a thin film-type force sensor 621 is directly attached to a tooth 622 of a friction element plate 623, covered with a protective sleeve 624. Sleeve 624 is preferably made from rubber, plastic or metal. When plate 623 is installed into a transmission case 625, sensor 621 directly measures contact load 626 between friction element tooth 622 and a spline 627 through sleeve layer 624, providing a relative measure of the load exerted onto off-going friction element D.

Figure 19:
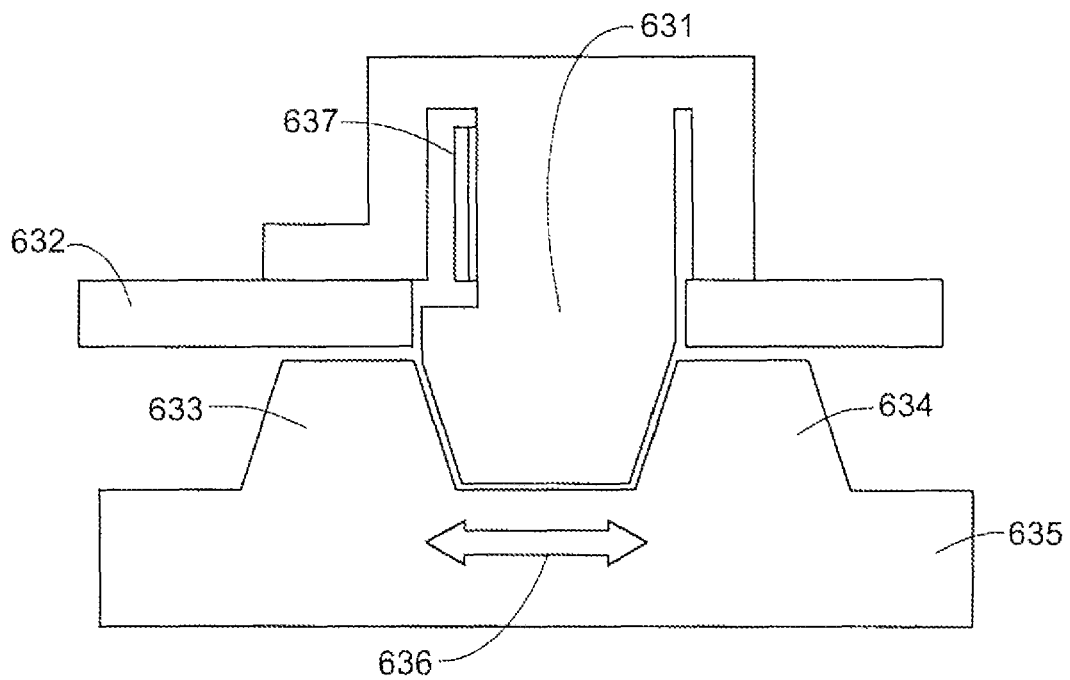
FIG. 19 depicts a load sensor assembly in accordance with another preferred embodiment of the invention formed of a metal beam for measuring a relative load level on the off-going friction element.

FIG. 19 shows another preferred embodiment of the invention wherein a metal beam 631, which is securely anchored to a transmission case 632, is installed and positioned between two teeth 633, 634 of an off-going friction element plate 635. As a load level 636 exerted on plate 635 varies, a strain level of beam 631 changes. The level of the strain is detected through a strain sensor 637, providing a relative measure of torque load exerted on off-going friction element D. Optionally, a cover may be added to protect strain sensor 637.

Figure 20:
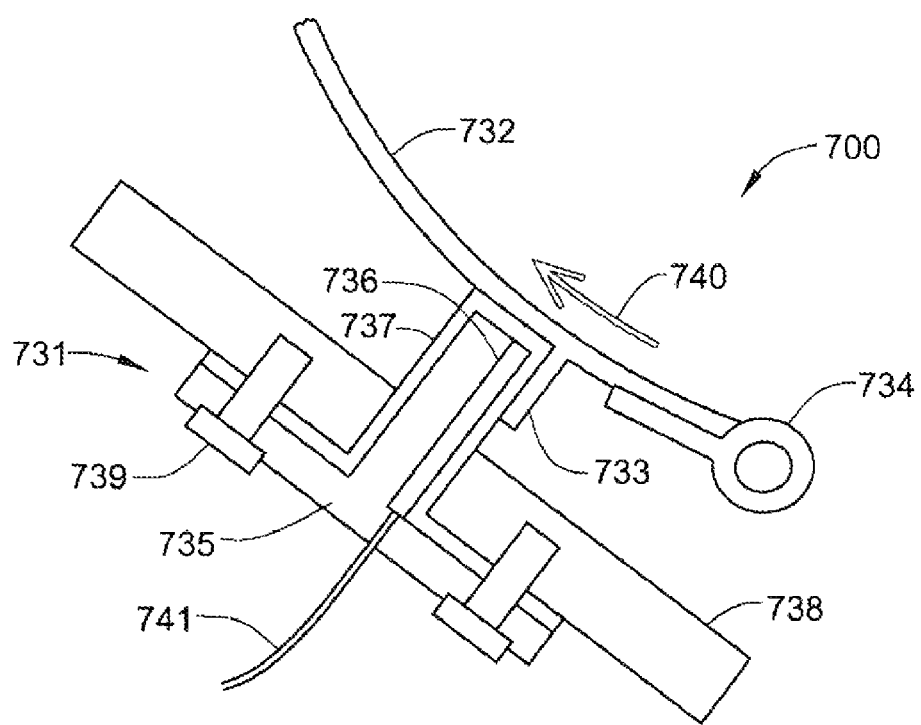
FIG. 20 depicts a load sensor assembly in accordance with another preferred embodiment of the invention installed on a band brake type friction element for measuring a relative load level on the friction element.

FIGS. 20, 21A, 21B, 21C, 22A, 22B and 23-29 show various preferred embodiments of the invention relating to directly measuring torque in a friction element. More specifically, FIG. 20 shows a partial view of a band brake system 700 with a load sensing assembly 731. Brake system 700 includes an anchor end of a band strap 732, a pin or a hook 733, and an anchor bracket 734. Band strap 732 is preferably either a single-wrap or double-wrap type. Load sensor assembly 731 includes an assembly core 735, a load sensing unit 736 and a protective sleeve or cover 737. Assembly core 735 is made of a metal and securely mounted to a transmission case 738 with a bolt 739 or any other means. Cover 737 may be made of metal, rubber, plastic or any other materials. Cover 737 protects sensor unit 736 from direct contact with pin or hook 733 for reduced sensor material wear. Cover 737 may be made of a thermally-insulated material to protect sensor 736 from heat. Cover 737 also acts as a protective shield against any other hostile conditions that include electro-chemical reaction with transmission oil. Load sensing unit 736, which may be a pressure resistive film-type, is positioned between core 735 and cover 737. The tip of sensor 736 is positioned against pin 733 across cover 737. When a band engagement is commanded, strap 732 is pulled by a hydraulic servo (which is described below) in the direction shown with an arrow 740. Band strap 732 stretches slightly, pushing pin or hook 733 against load sensor 736. Load sensor 736 generates an electrical signal according to a magnitude of the contact force. That is, sensor 736 provides a relative measure of band tension at the location of pin 733. The electrical signal is transmitted to a data acquisition unit (not shown) and then to controller 4 through an electrical cable 741.

Figure 21A:
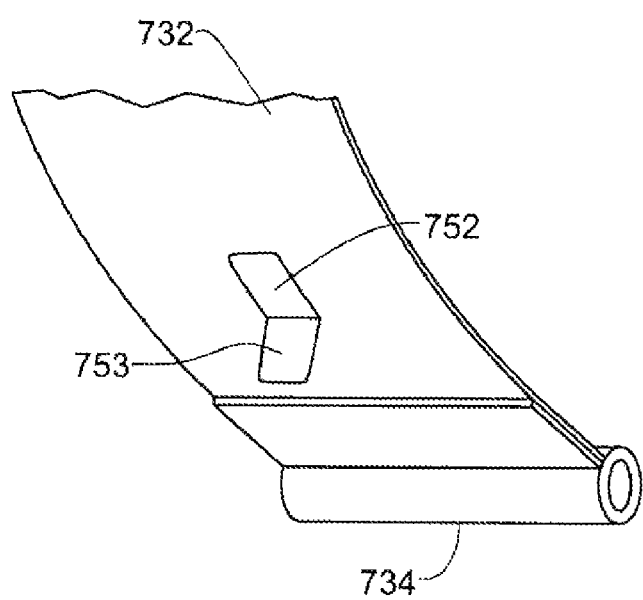
FIGS. 21A-21C depict a load sensor assembly in accordance with another preferred embodiment of the invention installed on a band brake type friction element for measuring a relative load level on the friction element.
Figure 21B:
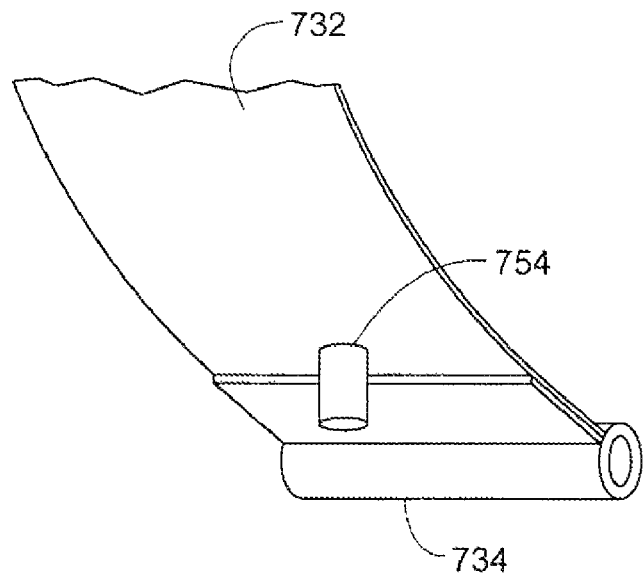
Figure 21C:
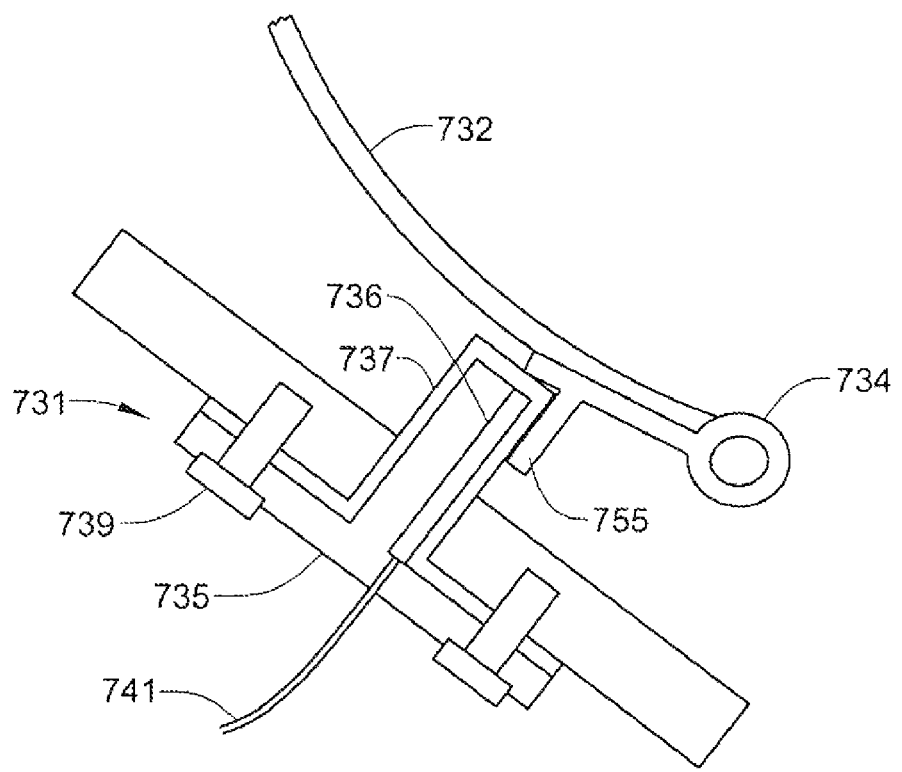

FIGS. 21A, 21B and 21C depict band strap designs in detail. In FIG. 21A, a band strap 732 has a part punched out and bent to form a pin or a hook 753 and a hole 752. Hole 752 also acts as an oil drain during band engagement. In FIG. 21B, a small pin or a block 754 is riveted, screwed or welded to strap 732. Alternatively, a pin or a hook 755 can be formed as a part of an anchor bracket 734 as shown in FIG. 21C. A pin 755 is attached to a band anchor bracket 734 instead of a strap 732. Sensor assembly 731 is positioned against the pin 755. Since bracket 732 is stiller than the strap 732, its strain is smaller under loaded conditions during both holding and engagement. Thus, a level of force exerted onto a load sensor 736 through a micro displacement of pin 755 is reduced significantly. The lower stress level improves the life of the sensor assembly 731 while enabling the use of a sensor 736 rated for a lower maximum force.

Figure 22A:
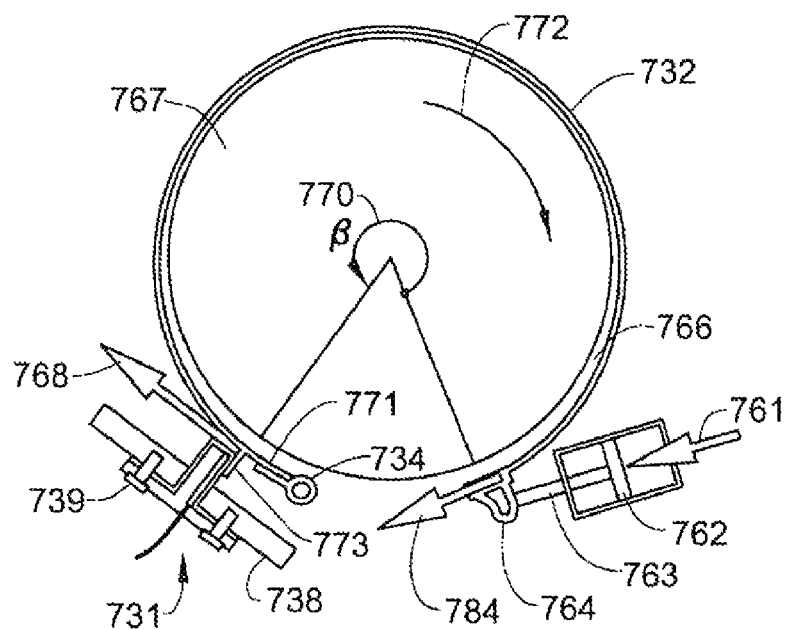
FIGS. 22A and 22B depict a load sensor assembly in accordance with another preferred embodiment of the invention installed on a band brake type friction element for measuring a relative load level on the friction element.

FIG. 22A illustrates sensor functions during a band engagement process. When the engagement is initiated, transmission controller 4 sends an electrical signal I(t) to raise and regulate a hydraulic force 761 applied to a servo piston 762. As servo piston 762 is stroked, a servo rod 763 pulls one end 764 of band strap 732. Tension around strap 732 builds up, squeezing out lubrication oil 766 from a band-drum interface. During the engagement, brake torque from strap 732 to a drum 767 is partly transmitted through viscous shear across oil 766. The brake torque is transmitted through a mechanical frictional force once strap 732 makes physical contact with drum 767. According to a conventional analysis, the relationships between engagement torque $T_{eng}$, band tension at a pin $F_{pin}$ 733 and band tension at a servo $F_{servo}$ 769 can be written as follows, assuming a Coulomb friction model as a primary torque transfer mechanism between band strap 732 and drum 767:

$$T_{eng} = F_{servo} R(e^{\mu\beta} - 1) \qquad \text{Eq. (4)}$$

$$F_{pin} = F_{servo} e^{\mu\beta} \qquad \text{Eq. (5)}$$

where R=drum radius, m=a Coulomb friction coefficient, b=a band wrap angle 770 assuming that pin 733 is positioned sufficiently close to an anchor 734. Drum 767 rotates in the same direction 772 as the hydraulic force 761. Substituting Eq. (5) into Eq. (4) yields:

$$T_{eng} = F_{pin} R(1 - e^{-\mu\beta}) \text{ or } F_{pin} = \frac{T_{eng}}{R(1 - e^{-\mu\beta})} \qquad \text{Eq. (6)}$$

Since the electrical output signal $S_{pin}$ from the sensor is approximately linear with band tension $F_{pin}$:

$$S_{pin} = k F_{pin} \qquad \text{Eq. (7)}$$

where k is a proportional constant. Substituting Eq. (7) into Eq. (6) yields:

$$S_{pin} = \frac{k}{R(1-e^{-\mu\beta})} T_{eng} = k' T_{eng} \text{ or } \frac{dS_{pin}}{dt} = k' \frac{dT_{eng}}{dt} \quad \text{Eq. (8)}$$

where $$k' = \frac{k}{R(1-e^{-\mu\beta})} \quad \text{Eq. (9)}$$

According to Eq. (8), the sensor output $S_{pin}$ provides a relative measure of band brake engagement torque $T_{eng}$.

This embodiment provides a relative measure of $T_{eng}$ and its derivative ($dT_{eng}/dt$) that enables a closed loop control of on-coming friction element engagement process during torque phase 32. It significantly improves band engagement control, mitigating a sudden rise of band brake torque known as "grabbing" behaviors. Alternatively, the sensor signals may be utilized to adaptively optimize open-loop calibration parameters such as a rate of pressure rise as a function of oil temperature in order to achieve a consistent ($dT_{eng}/dt$). The similar analysis can be applied to the so-called "de-energized" band engagement where the drum spins in the opposite direction of the servo.

Figure 22B:
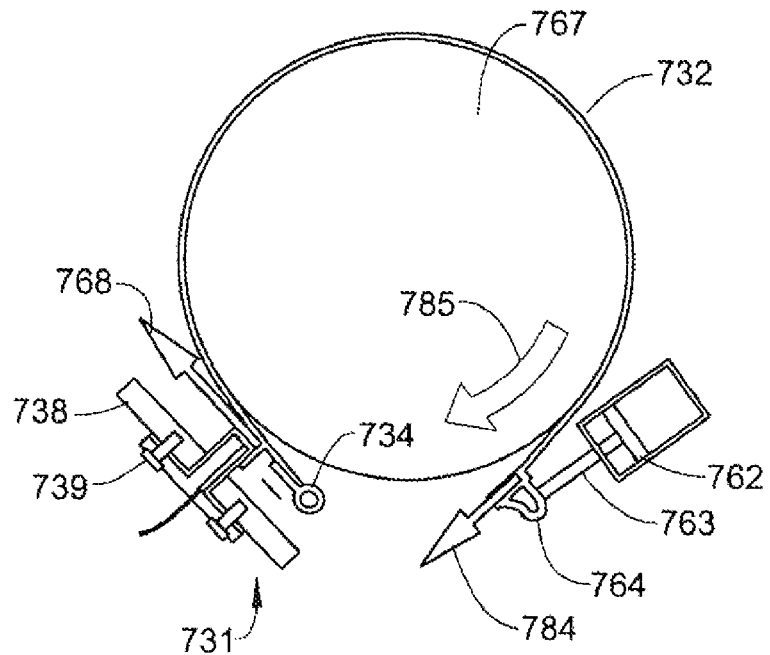

FIG. 22B illustrates sensor functions while band strap 732 is securely engaged around drum 767 under a holding condition without any slippage. In this case, the band tension $F_{pin}$ at pin 733 reflects both the level of the band tension $F_{servo}$ 784 at the servo and the level of torque load $T_{load}$ 785 exerted onto band 732 and drum 767 from the adjoining components (not shown). It is important that one should clearly differentiate $T_{load}$ from $T_{eng}$ which is brake torque exerted from the band to the dram under slipping conditions.

According to a conventional analysis, the relationships between $F_{pin}$, $F_{servo}$ and $T_{load}$ can be algebraically written as:

$$F_{pin} = F_{servo} + \frac{T_{load}}{R} \text{ or } T_{load} = R(F_{pin} - F_{servo}) \quad \text{Eq. (10)}$$

Substituting Eq. (10) into Eq. (7), the sensor output $S_{pin}$ can be described as a function of $F_{servo}$ and $T_{load}$ as:

$$S_{pin} = kF_{pin} = kF_{servo} + \frac{k}{R} T_{load} \quad \text{Eq. (11)}$$

Note that $F_{servo}$ is a function of an electrical signal I commanded to a hydraulic control system from a transmission controller. That is:

$$F_{servo} = F_{servo}(I) \quad \text{Eq. (12)}$$

Substituting Eq. (12) into Eq. (11) results in:

$$S_{pin} = kF_{pin} = kF_{servo}(I) + \frac{k}{R} T_{load} \quad \text{Eq. (13)}$$

In the absence of $T_{load}$, Eq. (13) becomes:

$$S_{pin} = kF_{servo}(I) \equiv S_{pin}^{noload}(I) \quad \text{Eq. (14)}$$

where $S_{pin}^{noload}$ is defined as the sensor output measured under no load condition for a given level of I. In practice $S_{pin}^{noload}$ can be readily obtained, as required, by sweeping the servo actuator with a varying level of I while a vehicle is in a stationary condition. Substituting Eq. (14) into Eq. (13) yields:

$$S_{pin} - S_{pin}^{noload}(I) = \frac{k}{R} T_{load} \quad \text{Eq. (15)}$$

Thus, $S_{pin} - S_{pin}^{noload}(I)$ provides a relative measure of torque load $T_{load}$ for a given electrical input I. The optimal timing to release off-going friction element during a synchronous shift is when the load exerted onto off-going friction element or $T_{load}$ becomes zero. This can be readily determined by sampling $S_{pin}$ and evaluating $S_{pin} - S_{pin}^{noload}(I)$ for a given electrical signal I. The use of the load sensor assembly according to this embodiment, significantly improves band release controllability during a synchronous shift under all the operating conditions.

Figure 23:
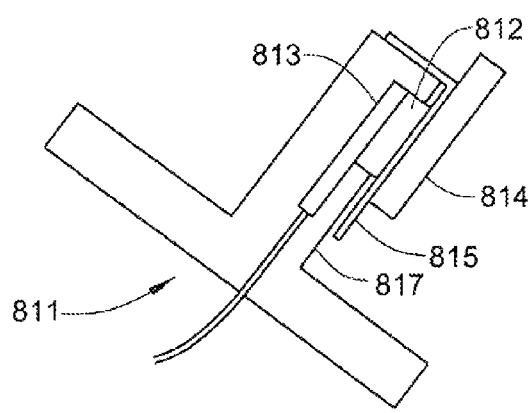
FIG. 23 depicts a load sensor assembly in accordance with another preferred embodiment of the invention installed on a band brake type friction element for measuring a relative load level on the friction element.
Figure 24:
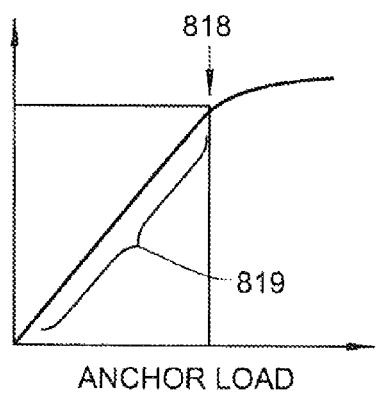
FIG. 24 depicts a chart in accordance with another preferred embodiment of the invention.

FIG. 23 shows a cross-sectional view of another sensor assembly 811 including a cushion element 812 inserted between a load sensor 813 and a pin or a block 814 that is attached to a band strap or an anchor bracket. Cushion element 812 is preferably made of a rubber. Alternatively, cushion element 812 may be made of a metal in the form of a spring such as a disk spring or a conical spring. A protective cover 815 is preferably positioned between cushion element 812 and block 814. Cover 815 is readily slidable at a nominal force under loaded conditions. The loading force is transmitted from block 814 to load sensor 813 by deformation of cushion element 812. Accordingly, cushion element stiffness is used to specify a force range at sensor 813 for a given range of loading force at block 814. The force transmitted to load sensor 813 becomes limited once the cushion element surface becomes flush with surface 817 of the assembly core. This non-linear characteristic indicated at 818 enables high resolution force measurement for a targeted load range 819 as shown in FIG. 24 while protecting sensor 813 from excessive loading.

Figure 25:
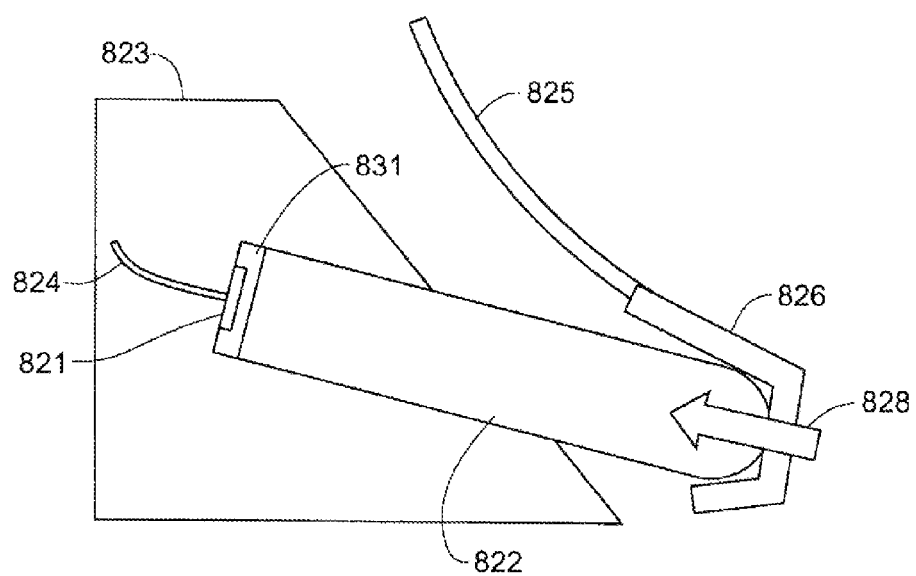
FIG. 25 depicts a load sensor assembly in accordance with another preferred embodiment of the invention installed on a band brake type friction element for measuring a relative load level on the friction element.

FIG. 25 shows an alternative embodiment of this invention. In this design, a load sensor 821 is placed at the bottom of a band anchor pin 822 inside a transmission case 823. Electrical cable 824 attached to sensor 821 is routed outside through case 823. The tip of pin 822 is inserted into an anchor bracket 826, which is attached to band strap 825. When the band brake system is actuated, strap 825 is hydraulically or mechanically tightened around a drum such that anchor bracket 826 pulls pin 822 in the direction of anchor load 828 as represented by an arrow. Accordingly, load sensor 821 directly measures an anchor load 828 exerted onto pin 822 from the anchor bracket 826. A cushion element 831 is preferably placed between the bottom of an anchor pin 822 and load sensor 821. Note that the sensing area of sensor 821 is smaller than the surface area of cushion element 831. The anchor load supported by pin 822 is distributed over the surface of cushion element 831. Accordingly, only part of the anchor load is transmitted to load sensor 821. This enables the use of a sensor rated for a lower maximum force.

Figure 26:
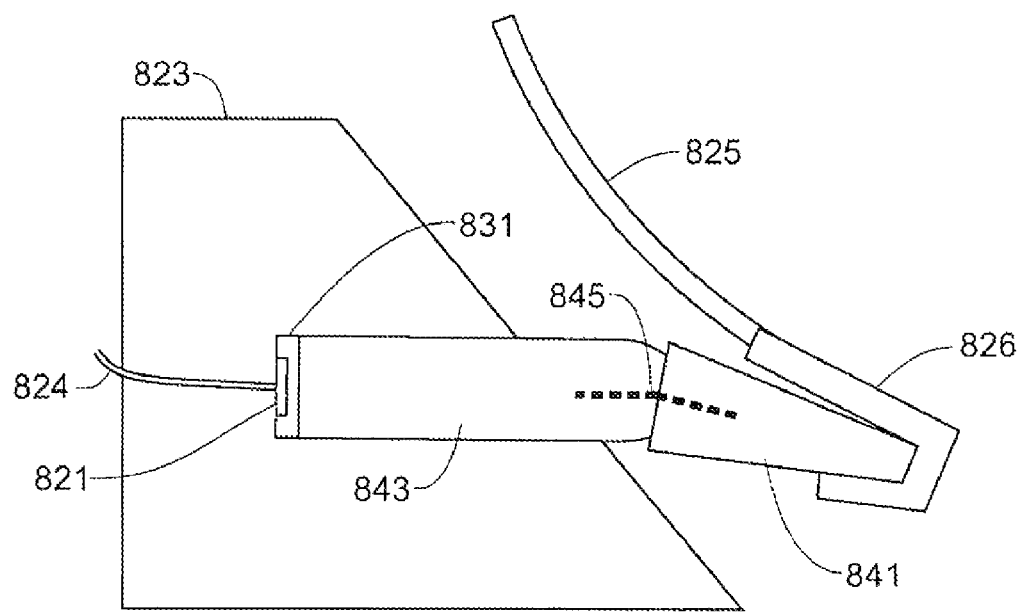
FIG. 26 depicts a load sensor assembly in accordance with another preferred embodiment of the invention installed on a band brake type friction element for measuring a relative load level on the friction element.

In FIG. 26, a strut 841 is inserted between an anchor bracket 826 and an anchor pin 843. Strut 841 enables the flexible placement of anchor pin 843 with respect to band strap 825 and transmission case 823. Also, an angle 845 between strut 841 and pin 843 may be adjusted to optimize a level of the axial loading that bracket 876 exerts onto pin 843 through strut 841. Cushion element 831 and the reduced axial loading allow the use of a sensor 821 rated for a lower maximum force. Alternatively, angle 845 may be adjusted to reduce the side loading onto pin 843 to minimize sensor output hysteresis caused by sticky pin displacement under the loaded conditions.

The embodiment of the invention in FIG. 27 shares many of the same features described in connection with the embodiment in FIG. 26. First, anchor pin 853 is inserted into an unthreaded hole 852 inside transmission case 823. Its large head 854 prevents pin 853 from falling through hole 852. A cushion element 836 and a load sensor 821 are placed against pin head 854. Cushion element 836 may be made of a rubber and act as a seal to protect the sensor 821 from transmission oil. Behind sensor 821 and cushion element 836 is a sensor support dish 857, which may be made of a metal. Sensor support dish 857 is backed by a large plug 858 inserted into a threaded hole 859. The position of plug 858 may be adjusted and locked with a nut 860 in order to set anchor pin 853 to a desirable position with respect to anchor bracket 826 and strut 841.

Figure 27:
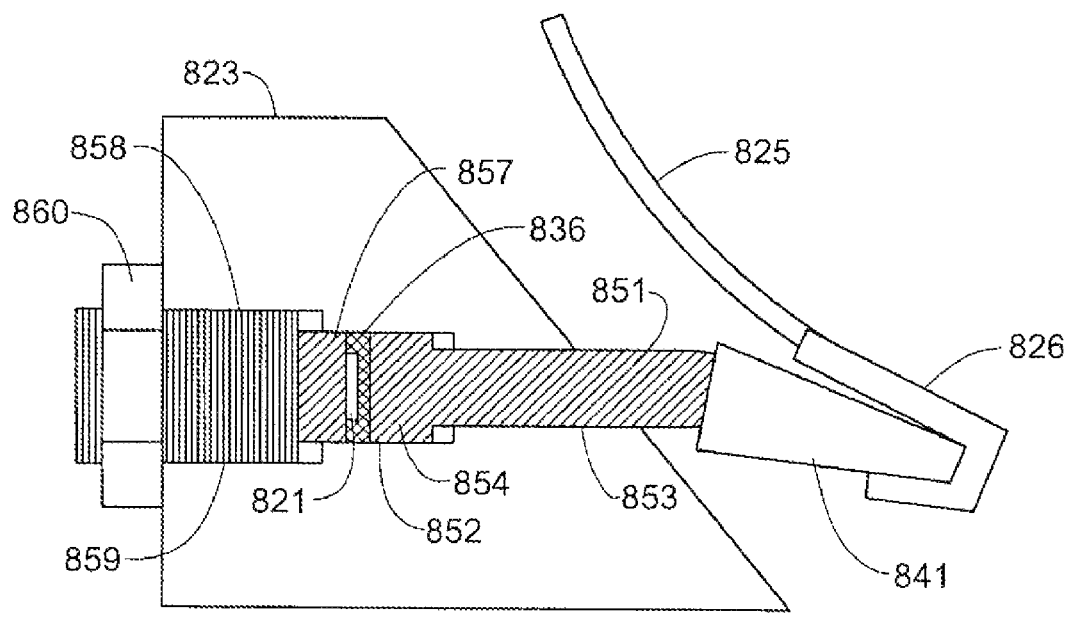
FIG. 27 depicts a load sensor assembly in accordance with another preferred embodiment of the invention installed on a band brake type friction element for measuring a relative load level on the friction element.
Figure 28:
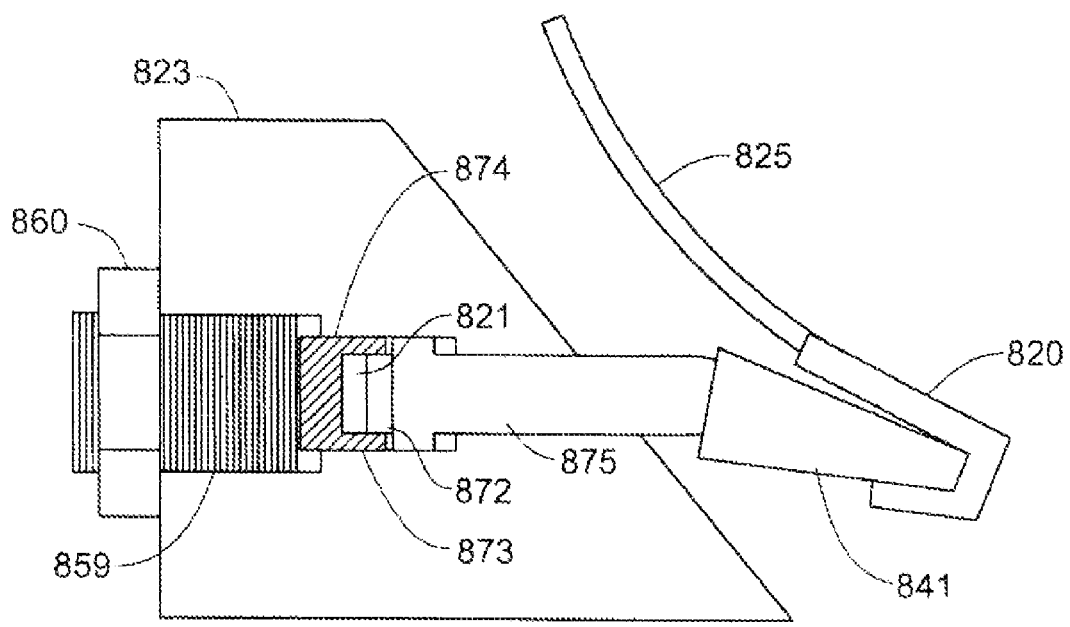
FIG. 28 depicts a load sensor assembly in accordance with another preferred embodiment of the invention installed on a band brake type friction element for measuring a relative load level on the friction element.

The embodiment of the invention shown in FIG. 28 shares features with the embodiment for FIG. 27. Specifically, a load sensor 821 is placed behind a cushion element 872 inside support dish 874 with a raised retaining wall 873. Cushion element 872 is preferably made of rubber. Alternatively, cushion element 872 may be made of metal in the form of a spring such as a disk or a conical spring. Under a no load condition, the surface of cushion element 872 is in contact with that of a pin 875, while the end of retaining wall 873 is away from the surface of pin 875. When the anchor load is below a predetermined level, the entire load is transmitted to sensor 821 through the elastic deformation of cushion element 872. As the anchor load increases, cushion element 872 becomes compressed. Once the surface level of cushion element 872 becomes flush with the end of retaining wall 873, retaining wall 873 starts supporting the load exerted on pin 875, limiting the load on sensor 821.

Figure 29:
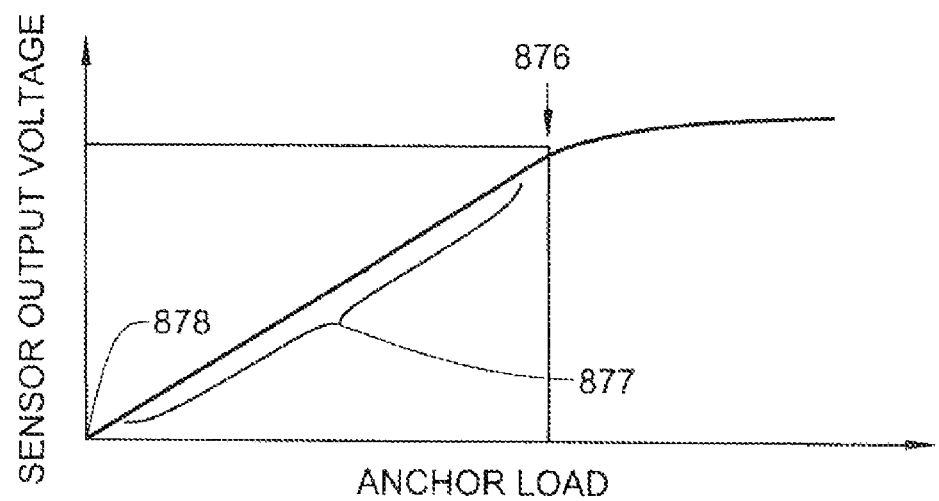
FIG. 29 depicts a chart in accordance with another preferred embodiment of the invention.

As shown in FIG. 29, cushion element stiffness determines where the sensor output starts leveling off at 876. This embodiment of the invention enables the sensor performance to be targeted for a specific load range, maximizing a measurement resolution 877. In addition, sensor output voltage at limiting load level 876 and at zero load level 878 can be used to auto-calibrate sensor 821 for enabling absolute load measurements. That is when the sensor output reaches its maximum plateau, a transfer function between sensor output voltage and load level can be mapped based on two point calibration. This feature is extremely useful, especially if sensor characteristics drift over time or vary under different operating conditions. This load-limiting feature also protects the sensor from overloading, preventing its failure.

Based on the above, it should be readily apparent that the present invention provides numerous advantages over prior friction element control during a torque phase of gear-ratio changing. The preferred embodiments provide a consistent output shaft torque profile for a powertrain system with a step-ratio automatic transmission system during a synchronous friction element-to-friction element upshift, which reduces shift shock. Also, there is a significant reduction in shift feel variability for a powertrain system with a step-ratio automatic transmission system during a synchronous friction element-to-friction element upshift. The preferred embodiments of the invention permit the use of either absolute or relative load levels which are directly measured or estimated. The use of a relative load profile, instead of absolute load levels, eliminates the need of full-sensor calibration, while the use of a relative load profile only requires one point sensor calibration that corresponds to zero load level and improves robustness against sensor drift over time. The preferred embodiments also provide for reduced output shaft torque oscillation at the beginning of the inertia phase due to the release of the off-going friction element at or near the ideal release timing where its load level is zero or close to zero and robustness against the variability of off-going friction element breakaway friction coefficient by means of a quick release of the off-going friction element at the ideal synchronization timing.

Further advantages include a consistent output shaft torque profile and significant reduction in shift feel variability for a powertrain system with a step-ratio system during a torque phase of a synchronous friction element-to-friction element upshift and during a torque phase of a non-synchronous upshift with an overrunning coupling element. Further, the system provides robustness against the variability of off-going friction element breakaway friction coefficient by means of a quick release of an off-going friction element at an ideal synchronization timing during a synchronous shift and against the variability of a friction element actuation system for both synchronous and non-synchronous shifts.

A clutch load sensor assembly provides a relative measure of torque load exerted to the clutch while it is engaged. A band brake load sensor assembly provides a relative measure of engagement torque (brake torque) and its derivative during an engagement process while a band slips against a drum and a relative measure of torque load exerted onto a band and a drum while the band is securely engaged to the drum without slippage. Sensor output may be calibrated with respect to a command signal to a band servo actuator while torque load is zero. Use of a protective cover in the sensor assembly prevents a direct contact between a load sensing material and the pin for reduced sensor material wear; and shields the sensor from hostile conditions that include heat and electro-chemical interaction, such as with transmission oil.

Although described with reference to preferred embodiments of the invention, it should be understood that various changes and/or modifications can be made to the invention without departing from the spirit thereof. For example, the invention could be extended to a double-wrap band brake system. In general, the invention is only intended to be limited by the scope of the following claims.

The invention claimed is:

1. A method for controlling gear ratio shifts in a multiple-ratio automatic transmission for an automotive vehicle powertrain, the automatic transmission including an input torque source, a torque output member, gearing defining multiple torque flow paths from the input torque source to the torque output member, and first and second pressure actuated torque establishing elements for shifting from a first gear configuration with a low speed ratio to a second gear configuration with a higher speed ratio during a ratio upshift event having a preparatory phase, a torque phase and an inertia phase, the method comprising:

maintaining torque capacity of the first torque establishing element against slippage during the preparatory phase;

determining an amount of torque transmitted through the first torque establishing element during the torque phase;

increasing torque capacity of the second torque establishing element during the torque phase; and maintaining torque capacity of the first torque establishing element during the torque phase until the amount of torque transmitted through the first torque establishing element drops below a predetermined amount and then decreasing torque capacity of the first torque establishing element.

2. The method of claim 1, further comprising maintaining torque capacity of the first torque establishing element above the amount of torsional load exerted on the first torque establishing element during the torque phase.

3. The method of claim 1, wherein the predetermined amount is substantially zero.

4. The method of claim 1, further comprising using a torque sensor to measure the amount of torque transmitted through the first torque establishing element.

5. The method of claim 4, further comprising determining the predetermined amount by sampling torque sensor output from the torque sensor.

6. The method of claim 1, further comprising restoring torque from the input torque source following completion of the ratio upshift event at the end of the inertia phase.

7. The method of claim 1, further comprising reducing torque capacity of the first torque establishing element during a portion of the preparatory phase before maintaining the torque capacity of the first torque establishing element against slippage during the preparatory phase.

8. The method of claim 1, further comprising reducing transmission input torque from the torque source during the inertia phase.

9. The method of claim 1, further comprising increasing torque capacity of the second torque establishing element at a first rate during the preparatory phase, and also increasing torque capacity of the second torque establishing element at a second rate during the torque phase as the torque capacity of the first torque establishing element is decreased during the torque phase until the first torque establishing element begins to slip.

10. A method for controlling gear ratio shifts in a multiple-ratio automatic transmission for an automotive vehicle powertrain, the automatic transmission including an input torque source, a torque output member, gearing defining multiple torque flow paths from the input torque source to the torque output member and first and second pressure actuated torque establishing elements for establishing, respectively, a first gear configuration with a low speed ratio and a second gear configuration with a higher speed ratio during a ratio upshift event having a preparatory phase, a torque phase and an inertia phase, the method comprising:
  maintaining torque capacity of the first torque establishing element against slippage during the preparatory phase;
  determining an amount of torque transmitted through the first torque establishing element during the torque phase;
  increasing torque capacity of the second torque establishing element during the torque phase; and
  determining a timing for releasing the first torque establishing element based on the amount of torque transmitted through the first torque establishing element.

11. The method of claim 10 wherein determining the timing for releasing the first torque establishing element further includes predicting a first amount of time that will be required to decrease the torque capacity of the first torque establishing element to substantially zero and determining when the amount of torque transmitted through the first torque establishing element will be substantially zero, and beginning to decrease the torque capacity of the first torque establishing element so that the torque capacity of the first torque establishing element will be substantially zero when the amount of torque transmitted through the first torque establishing element becomes substantially zero.

12. The method of claim 10, further comprising restoring torque from the input torque source following completion of the ratio upshift event at the end of the inertia phase.

13. The method of claim 10, further comprising restoring torque from the input torque source following completion of the ratio upshift event at the end of the inertia phase.

14. The method of claim 10, further comprising reducing torque capacity of the first torque establishing element during a portion of the preparatory phase before maintaining the torque capacity of the first torque establishing element against slippage during the preparatory phase.

15. The method of claim 10, further comprising reducing transmission input torque from the input torque source during the inertia phase.

16. The method of claim 10 further comprising increasing torque capacity of the second torque establishing element at a first rate during the preparatory phase, and also increasing torque capacity of the second torque establishing element at a second rate during the torque phase as the torque capacity of the first torque establishing element is decreased during the torque phase until the first torque establishing element begins to slip.

17. A method for controlling gear ratio shifts in a multiple-ratio automatic transmission for an automotive vehicle powertrain, the automatic transmission including an input torque source, a torque output member, gearing defining multiple torque flow paths from the input torque source to the torque output member, and first and second pressure actuated torque establishing elements for shifting from a first gear configuration with a low speed ratio to a second gear configuration with a higher speed ratio during a ratio upshift event having a preparatory phase, a torque phase and an inertia phase, the method comprising:
  maintaining torque capacity of the first torque establishing element against slippage during the preparatory phase;
  determining an amount of torque transmitted through the second torque establishing element;
  increasing torque capacity of the second torque establishing element during the torque phase at a desired rate based on the amount of torque determined so as to effect a closed loop control of the amount of torque transmitted through the second torque establishing element for at least a portion of the torque phase; and
  maintaining torque capacity of the first torque establishing element during the torque phase until the amount of torque transmitted through the first torque establishing element drops below a predetermined amount and then decreasing torque capacity of the first torque establishing element.

18. The method of claim 17, further comprising using a torque sensor to measure the amount of torque transmitted through the second torque establishing element.

19. The method of claim 17, further comprising estimating the amount of torque transmitted through the second torque establishing element.

20. The method of claim 19, wherein estimating the amount of torque is conducted by measuring different speeds of several portions of the gearing and using the measured different speeds to determine the amount of torque.

21. The method of claim 17, wherein increasing torque capacity of the second torque establishing element during the torque phase at a desired rate is based on a calibrated slope that establishes the desired rate based on measurements or estimates of torque capacity for each sub-divided interval of the torque phase.

22. A method for controlling gear ratio shifts in a multiple-ratio automatic transmission for an automotive vehicle powertrain, the automatic transmission including an input torque source, a torque output member, gearing defining multiple torque flow paths from the input torque source to the torque output member, and first and second pressure actuated torque establishing elements for establishing by shifting, respectively, a first gear configuration with a low speed ratio and a second gear configuration with a higher speed ratio during a ratio upshift event having a preparatory phase, a torque phase and an inertia phase, the method comprising:

maintaining torque capacity of the first torque establishing element against slippage during the preparatory phase;

determining an amount of torque transmitted through the first torque establishing element during the torque phase;

increasing torque capacity of the second torque establishing element during the torque phase at a desired rate based on the amount of torque determined so as to effect a closed loop control of the amount of torque transmitted through the second torque establishing element for at least a portion of the torque phase;

determining a timing for releasing the first torque establishing element based on the amount of torque transmitted through the first torque establishing element; and maintaining torque capacity of the first torque establishing element during the torque phase until the amount of torque transmitted through the first torque establishing element drops below a predetermined amount and then decreasing torque capacity of the first torque establishing element.

\* \* \* \* \*